(12) United States Patent  
Kodama

(10) Patent No.: US 7,352,908 B2  
(45) Date of Patent: Apr. 1, 2008

(54) IMAGE COMPRESSION DEVICE, IMAGE DECOMPRESSION DEVICE, IMAGE COMPRESSION/DECOMPRESSION DEVICE, PROGRAM FOR EXECUTING ON A COMPUTER TO PERFORM FUNCTIONS OF SUCH DEVICES, AND RECORDING MEDIUM STORING SUCH A PROGRAM

(75) Inventor: Taku Kodama, Kanagawa (JP)

(73) Assignee: Ricoh Co., Ltd., Tokyo (JP)

( * ) Notice: Subject to any disclaimer, the term of this patent is extended or adjusted under 35 U.S.C. 154(b) by 867 days.

(21) Appl. No.: 10/390,263

(22) Filed: Mar. 14, 2003

(65) Prior Publication Data

US 2003/0202581 A1 Oct. 30, 2003

(30) Foreign Application Priority Data

Mar. 15, 2002 (JP) ............................. 2002-071470  
Jun. 12, 2002 (JP) ............................. 2002-171872

(51) Int. Cl.  
*G06K 9/36* (2006.01)

(52) U.S. Cl. ..................... 382/251; 382/232; 382/240

(58) Field of Classification Search ................ 382/232, 382/233, 240, 250, 246, 166, 118, 154, 199, 382/251; 375/240.18  
See application file for complete search history.

(56) References Cited

U.S. PATENT DOCUMENTS

| 5,563,960 | A | 10/1996 | Shapiro .................... 382/239 |
| 6,041,143 | A | 3/2000 | Chui et al. ................. 382/232 |
| 6,137,595 | A | 10/2000 | Sakuyama et al. ........... 358/1.9 |
| 6,215,916 | B1 | 4/2001 | Acharya ..................... 382/298 |
| 6,226,011 | B1 | 5/2001 | Sakuyama et al. .......... 345/600 |
| 6,526,161 | B1 * | 2/2003 | Yan ............................ 382/118 |
| 6,832,001 | B1 * | 12/2004 | Kashiwagi .................. 382/166 |
| 2002/0039440 | A1 | 4/2002 | Sakuyama .................. 382/166 |
| 2002/0159644 | A1 | 10/2002 | Sakuyama .................. 382/240 |
| 2002/0196970 | A1 | 12/2002 | Sano et al. ................. 382/166 |
| 2003/0002742 | A1 | 1/2003 | Sano et al. ................. 382/239 |

FOREIGN PATENT DOCUMENTS

| JP | 5012800 | 1/1993 |
| JP | 05064001 A | 3/1993 |
| JP | 05-083704 | 4/1993 |

(Continued)

OTHER PUBLICATIONS

Gray et al., "Quantization", IEEE, vol. 44, No. 6, Oct. 1998, pp. 2325-2383.*

(Continued)

*Primary Examiner*—Anh Hong Do  
(74) *Attorney, Agent, or Firm*—Blakely, Sokoloff, Taylor & Zafman LLP

(57) ABSTRACT

An image compression device comprising an image division unit dividing an image into a plurality of regions, a region designation unit designating a region of interest in the image, a quantization rate determination unit determining quantization rate with respect to each region divided by the image division unit, and a compression control unit controlling compression with respect to each region based on the quantization rate determined by the quantization rate determination unit is disclosed. In the image compression device, the quantization rate determination unit can determine quantization rate for the region of interest different from the quantization rate for the regions other than the region of interest.

6 Claims, 30 Drawing Sheets

FOREIGN PATENT DOCUMENTS

| | | |
|---|---|---|
| JP | 06022152 A | 1/1994 |
| JP | 06044692 A | 2/1994 |
| JP | 06350989 A | 12/1994 |
| JP | 2000040142 A | 2/2000 |
| JP | 2000-125293 | 4/2000 |
| JP | 2000-125294 | 4/2000 |
| JP | 2001285642 A | 10/2001 |
| JP | 2002-152517 | 5/2002 |
| JP | 2002-152744 | 5/2002 |
| JP | 2002-344732 | 11/2002 |
| WO | PCT/US98/19065 | 9/1999 |
| WO | WO 99/49412 | 9/1999 |

OTHER PUBLICATIONS

Hideyuki Tamura, "Introduction to Computer Image Processing", Soken Publishing, Ltd., 1985, 7 pages.

ANONYMOUS, "JPEG 2000 Part I Final Committee Draft Version 1.0," Mar. 16, 2000, pp. 1-190 (index and title page also attached).

Askelof, Joel et al., "Region of Interest Coding in JPEG 2000," Signal Processing: Image Communication, vol. 17, No. 1, Jan. 2002, pp. 105-111.

Nguyen, E. et al., "A ROI Approach for Hybrid Image Sequence Coding," Proceedings of the International Conference on Image Processing (ICIP), Austin, Nov. 13-16, 1994, Los Alamitos, vol. 3, conf. 1, pp. 245-249.

EPO Office Action for EP Appln. No. 03 005 303.7-1247, mailed Sep. 14, 2006 (9 pages).

Taubman, D.: "JPEG 2000 Verification Model VM3A, ISO/IEC JTC1/SC29/WG1 N1143" ISO/IEC JTC1/SC29/WG1 N1143,, Feb. 1, 1999, pp. 1-90, XP002146099.

F. Ono et al., The Newest Information on the Coming Still Image Coding Standard JPEG2000, Technical Survey, vol. 83 No. 12, pp. 914-919. Unknown Date.

* cited by examiner

DECOMPOSITION_LEVEL_0

DECOMPOSITION_LEVEL_1

DECOMPOSITION_LEVEL_2

DECOMPOSITION_LEVEL_3

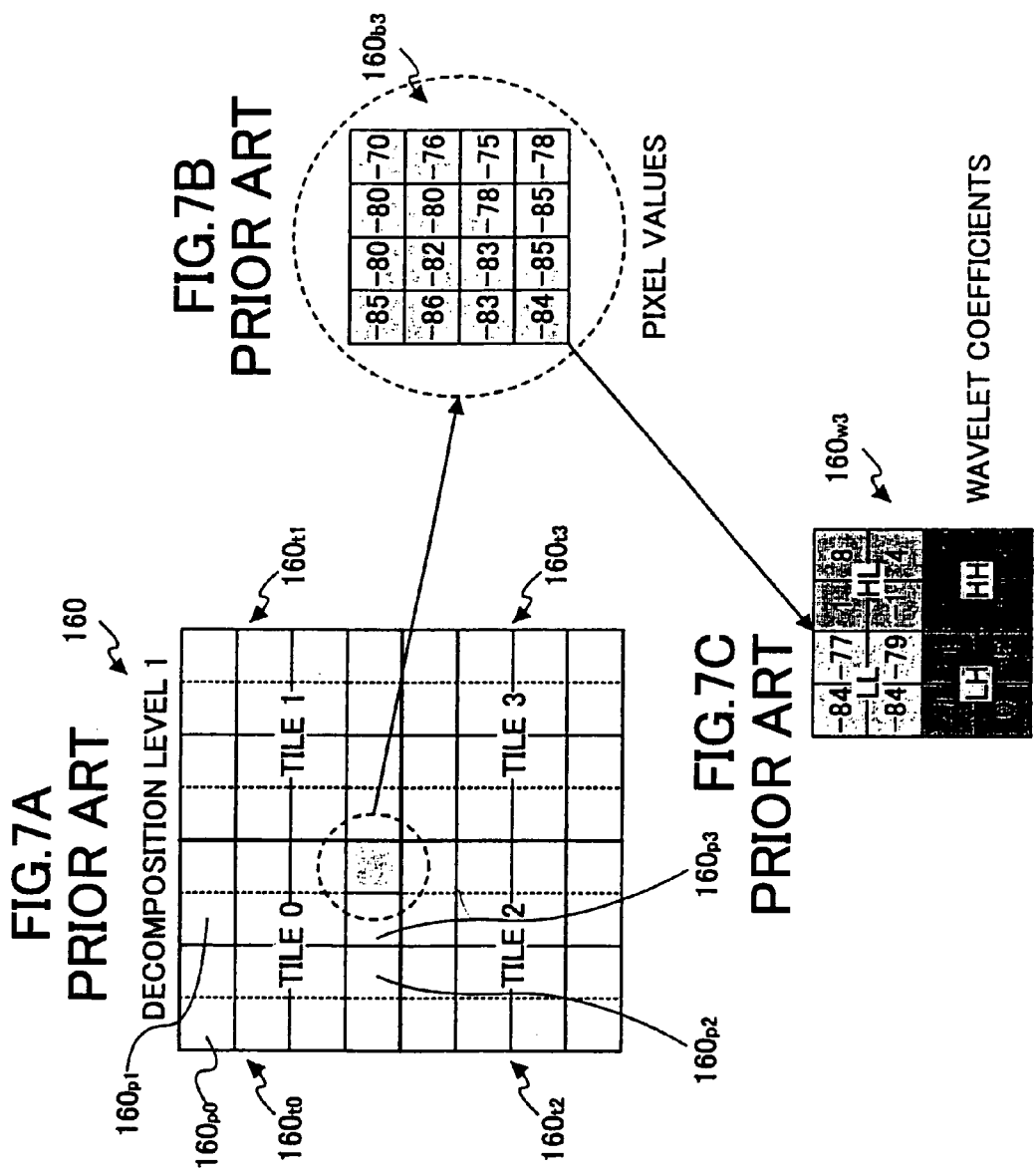

FIG.7D PRIOR ART

| | | | | |
|---|---|---|---|---|
| | −84 | −84 | −77 | −79 | ← COEFFICIENT
| LAYER 0 | − | − | − | − | ← SIGN
| LAYER 1 | 1 | 1 | 1 | 1 | } (MSB)
| | 0 | 0 | 0 | 0 |
| | 1 | 1 | 0 | 0 |
| LAYER 2 | 0 | 0 | 1 | 1 | } ABSOLUTE VALUES
| LAYER 3 | 1 | 1 | 1 | 1 |
| | 0 | 0 | 0 | 1 |
| | 0 | 0 | 1 | 1 | } (LSB)

| | | | | |
|---|---|---|---|---|
| | 1 | −1 | 8 | 4 | ← COEFFICIENT
| LAYER 0 | + | − | + | + | ← SIGN
| LAYER 1 | 0 | 0 | 0 | 0 | } (MSB)
| | 0 | 0 | 0 | 0 |
| | 0 | 0 | 0 | 0 |
| LAYER 2 | 0 | 0 | 1 | 0 | } ABSOLUTE VALUES
| LAYER 3 | 0 | 0 | 0 | 1 |
| | 0 | 0 | 0 | 0 |
| | 1 | 1 | 0 | 0 | } (LSB)

|        | -1 | 0 | -1 | -5 | ← COEFFICIENT |
|--------|----|----|----|----|---|
| LAYER 0 | − | 0 | − | − | ← SIGN |
| LAYER 1 | 0 | 0 | 0 | 0 | (MSB) |
|         | 0 | 0 | 0 | 0 | |
|         | 0 | 0 | 0 | 0 | |
| LAYER 2 | 0 | 0 | 0 | 0 | ABSOLUTE VALUES |
| LAYER 3 | 0 | 0 | 0 | 1 | |
|         | 0 | 0 | 0 | 0 | |
|         | 1 | 0 | 1 | 1 | (LSB) |

|        | 2 | 2 | 2 | 4 | ← COEFFICIENT |
|--------|----|----|----|----|---|
| LAYER 0 | + | + | − | + | ← SIGN |
| LAYER 1 | 0 | 0 | 0 | 0 | (MSB) |
|         | 0 | 0 | 0 | 0 | |
|         | 0 | 0 | 0 | 0 | |
| LAYER 2 | 0 | 0 | 0 | 0 | ABSOLUTE VALUES |
| LAYER 3 | 0 | 0 | 0 | 1 | |
|         | 1 | 1 | 1 | 0 | |
|         | 0 | 0 | 0 | 0 | (LSB) |

1HH

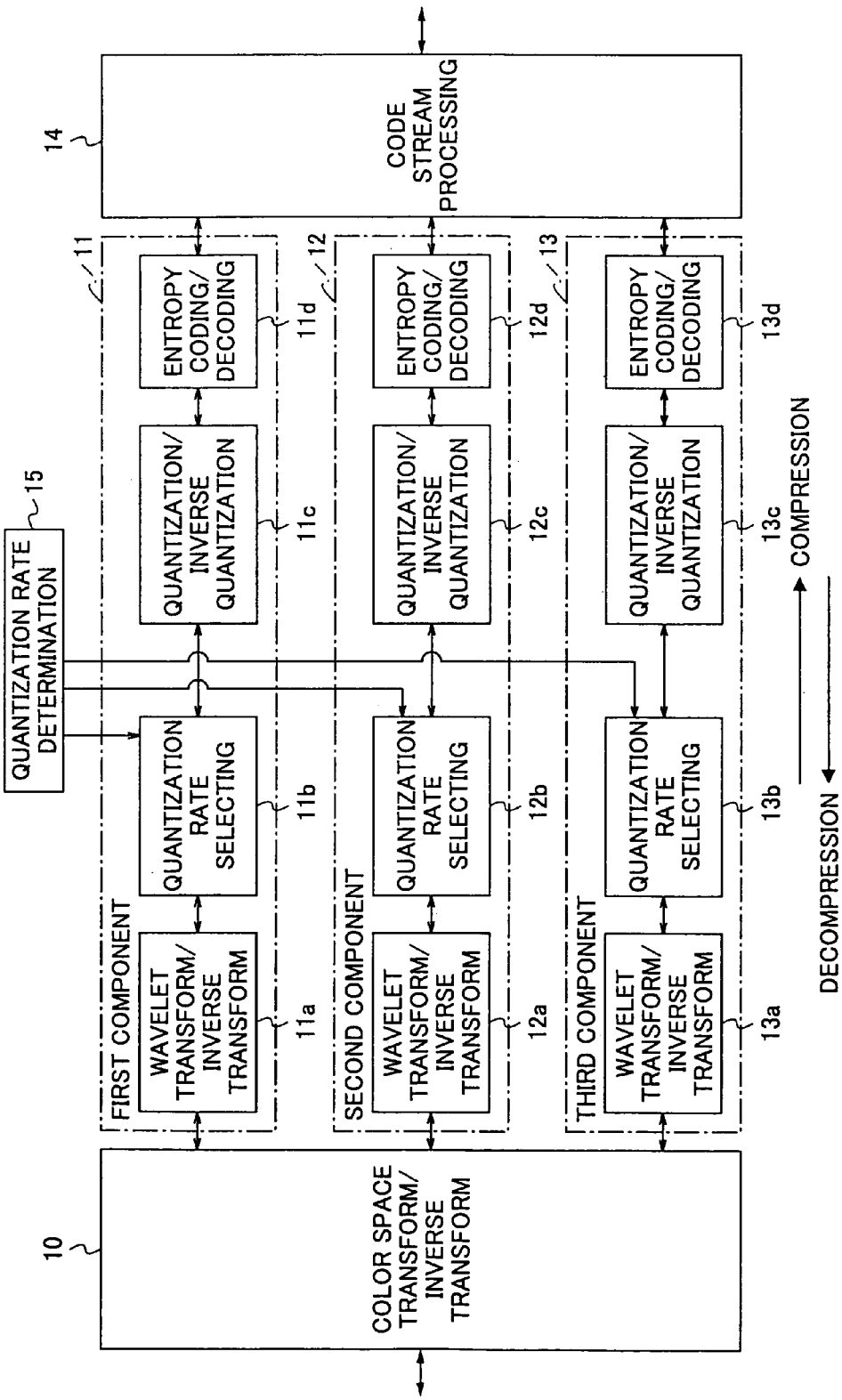

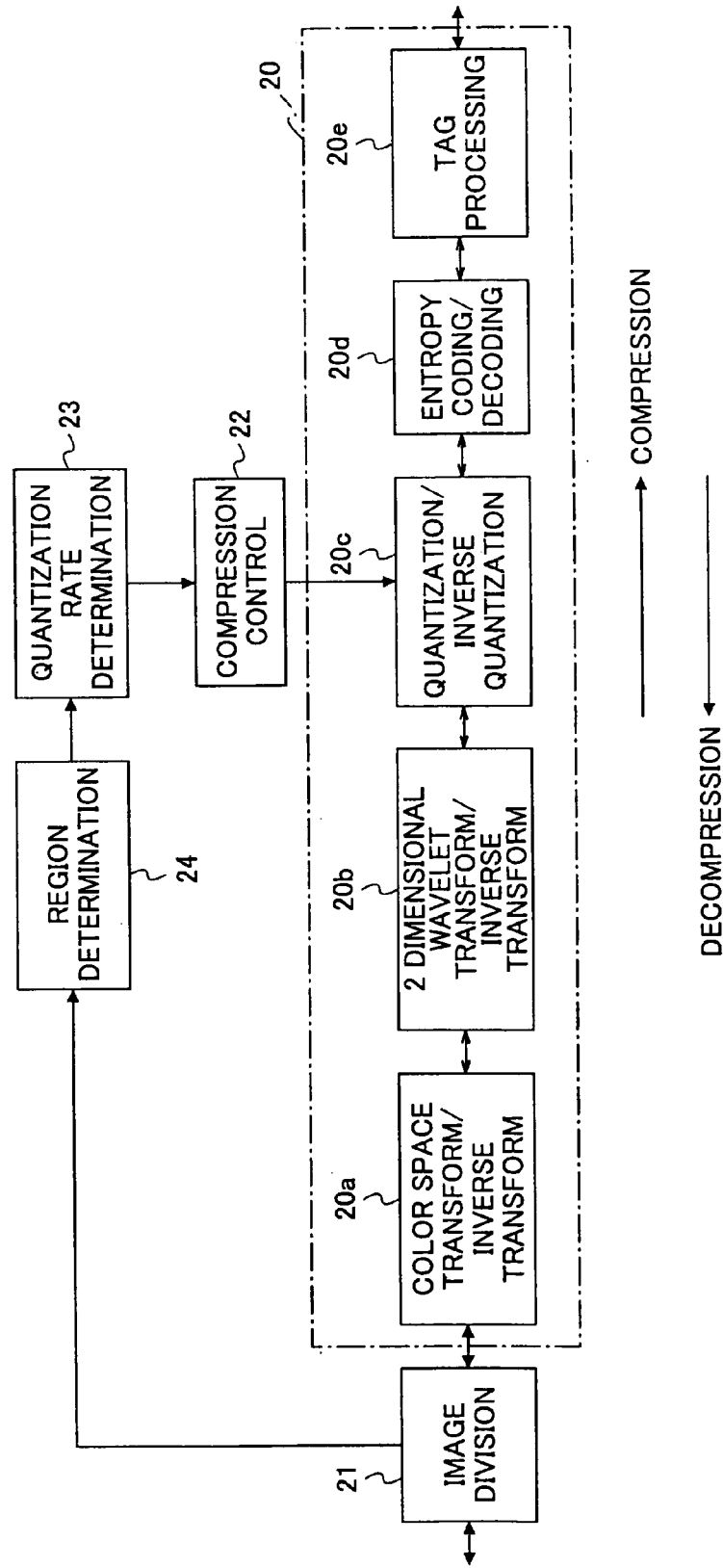

SELECTION EXAMPLE OF REGIONS OF INTEREST

| 3 | 7 | 11 | 15 |
| 2 | | | 14 |
| 1 | | | 13 |
| 0 | 4 | 8 | 12 |

41

TILE DIVISION

40

TILE DIVISION

REGION OF INTEREST

SELECTION EXAMPLE OF
REGIONS OF INTEREST

PRECINCT DIVISION

SELECTION EXAMPLE OF REGIONS OF INTEREST

44

CODE BLOCK DIVISION

| Tile Number | MSB | | | | | | | | | | | | LSB |
|---|---|---|---|---|---|---|---|---|---|---|---|---|---|
| | 12 | 11 | 10 | 9 | 8 | 7 | 6 | 5 | 4 | 3 | 2 | 1 | |
| 0 | | 0 | 1 | 2 | 3 | 4 | 5 | 6 | 7 | 8 | 9 | 10 | 11 |
| 1 | | 0 | 1 | 2 | 3 | 4 | 5 | 6 | 7 | 8 | 9 | 10 | 11 |
| 2 | | 0 | 1 | 2 | 3 | 4 | 5 | 6 | 7 | 8 | 9 | 10 | 11 |
| 3 | | 0 | 1 | 2 | 3 | 4 | 5 | 6 | 7 | 8 | 9 | 10 | 11 |
| 4 | | 0 | 1 | 2 | 3 | 4 | 5 | 6 | 7 | 8 | 9 | 10 | 11 |
| 5 | 10 | 0 | 0 | 0 | 1 | 1 | 1 | 2 | 2 | 2 | 3 | 4 | 5 |
| 6 | 10 | 0 | 0 | 0 | 1 | 1 | 1 | 2 | 2 | 2 | 3 | 4 | 5 |
| 7 | | 0 | 1 | 2 | 3 | 4 | 5 | 6 | 7 | 8 | 9 | 10 | 11 |
| 8 | | 0 | 1 | 2 | 3 | 4 | 5 | 6 | 7 | 8 | 9 | 10 | 11 |
| 9 | 10 | 0 | 0 | 0 | 1 | 1 | 1 | 2 | 2 | 2 | 3 | 4 | 5 |
| 10 | 10 | 0 | 0 | 0 | 1 | 1 | 1 | 2 | 2 | 2 | 3 | 4 | 5 |
| 11 | | 0 | 1 | 2 | 3 | 4 | 5 | 6 | 7 | 8 | 9 | 10 | 11 |
| 12 | | 0 | 1 | 2 | 3 | 4 | 5 | 6 | 7 | 8 | 9 | 10 | 11 |
| 13 | | 0 | 1 | 2 | 3 | 4 | 5 | 6 | 7 | 8 | 9 | 10 | 11 |
| 14 | | 0 | 1 | 2 | 3 | 4 | 5 | 6 | 7 | 8 | 9 | 10 | 11 |
| 15 | | 0 | 1 | 2 | 3 | 4 | 5 | 6 | 7 | 8 | 9 | 10 | 11 |

LAYER NUMBER TO WHICH EACH BIT PLANE IS ALLOCATED WITH RESPECT TO EACH TILE

FIG.24

| | \ Tile Number | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| MSB | 12 | 2 | 1 | 1 | 2 | 1 | 5 | 6 | 1 | 1 | 9 | 10 | 1 | 2 | 13 | 14 | 15 |
| | 11 | 4 | 4 | 4 | 4 | 4 | 0 | 0 | 4 | 4 | 0 | 0 | 4 | 4 | 4 | 4 | 4 |
| | 10 | 6 | 6 | 6 | 6 | 6 | 0 | 0 | 6 | 6 | 0 | 0 | 6 | 6 | 6 | 6 | 6 |
| | 9 | 8 | 8 | 8 | 8 | 8 | 3 | 3 | 8 | 8 | 3 | 3 | 8 | 8 | 8 | 8 | 8 |
| | 8 | 8 | 8 | 8 | 8 | 8 | 3 | 3 | 8 | 8 | 3 | 3 | 8 | 8 | 8 | 8 | 8 |
| | 7 | 10 | 10 | 10 | 10 | 10 | 5 | 5 | 10 | 10 | 5 | 5 | 10 | 10 | 10 | 10 | 10 |
| | 6 | 10 | 10 | 10 | 10 | 10 | 5 | 5 | 10 | 10 | 5 | 5 | 10 | 10 | 10 | 10 | 10 |
| | 5 | 12 | 12 | 12 | 12 | 12 | 7 | 7 | 12 | 12 | 7 | 7 | 12 | 12 | 12 | 12 | 12 |
| | 4 | 12 | 12 | 12 | 12 | 12 | 7 | 7 | 12 | 12 | 7 | 7 | 12 | 12 | 12 | 12 | 12 |
| | 3 | 13 | 13 | 13 | 13 | 13 | 9 | 9 | 13 | 13 | 9 | 9 | 13 | 13 | 13 | 13 | 13 |
| | 2 | 13 | 13 | 13 | 13 | 13 | 11 | 11 | 13 | 13 | 11 | 11 | 13 | 13 | 13 | 13 | 13 |
| LSB | 1 | 13 | 13 | 13 | 13 | 13 | 11 | 11 | 13 | 13 | 11 | 11 | 13 | 13 | 13 | 13 | 13 |

LEVEL OF INTEREST DETERMINATION EXAMPLES

IMAGE COMPRESSION DEVICE, IMAGE DECOMPRESSION DEVICE, IMAGE COMPRESSION/DECOMPRESSION DEVICE, PROGRAM FOR EXECUTING ON A COMPUTER TO PERFORM FUNCTIONS OF SUCH DEVICES, AND RECORDING MEDIUM STORING SUCH A PROGRAM

The present application claims priority to the corresponding Japanese Application No. 2002-071470 filed on Mar. 15, 2002 and Japanese Application No. 2002-171872 filed on Jun. 12, 2002, the entire contents of which are hereby incorporated by reference.

1. Field of the Invention

The present invention generally relates to image compression and decompression, and more specifically, to applying different quantization rates for regions of interest and regions other than the regions of interest in an image in image compression/decompression.

2. Description of the Related Art

Along with progress in image input technology and image output technology, demand for achieving high definition images has been remarkably increasing in recent years. With a digital cameras as image input apparatuses, cost reduction has been achieved for highly efficient charge-coupled devices (CCD) that can handle three million pixels, for example. Therefore, such CCDs are coming to be widely used in products in a reasonable price range. Realization of highly efficient CCDs is largely due to developments in silicon processing and device technology and it has overcome the trade-offs such as need for miniaturization and reduction in noise-to-signal ratio. It is expected that this tendency of an increasing number of pixels that can be processed by a single device will continue for a while.

Meanwhile, as for high definition image output/display apparatuses, realization of high performance and cost reduction is achieved in products that provide hard copies such as laser printers, ink-jet printers, sublimatic printers, and in products that provide soft copies on display screens such as flat-panel display devices including cathode ray tubes (CRT), liquid crystal displays (LCD), plasma display panels (PDP), and so forth.

The introduction of high-performance, inexpensive image input/output products into the market has promoted the popularization of high-definition images. Thus, it is expected that the demand for high-definition images will increase in various sectors. In fact, developments in technology related to communications networks including personal computers and the Internet accelerate such a trend even more. Especially, in these days, mobile apparatuses including portable phones and notebook-type personal computers are becoming even more widely used and therefore the opportunity to transmit or receive high definition images using various communications devices from all points is also rapidly increasing. Accordingly, it is inevitable that the demand for high performance and multi-function in image compression/decompression technology, which enable easy handling of high definition images, will increase.

As for an image compression/decompression algorithm that enables easy handling of high definition images, the Joint Photographic Experts Group (JPEG) standard is currently used most pervasively. The JPEG 2000 standard, which was designated as the international standard in 2001, is expected to be the next generation high definition image compression/decompression format. The JPEG 2000 algorithm not only has higher performance than that of the older JEPG standard but also has more functions, as well as more flexibility and scalability with respect to various applications.

FIG. 1 shows a block diagram illustrating a basic function according to the older JPEG algorithm. As shown, the JPEG algorithm includes the functions of the following units; a color space transformation/inverse transformation unit 50, a discrete cosine transformation/inverse transformation unit 51, a quantization/inverse-quantization unit 52, and an entropy coding/decoding unit 53. Generally speaking, lossy coding is used in order to obtain a high compression rate. Therefore, in most cases, the complete compression and decompression of an original image, in other words, lossless coding, is not performed. The lossy coding rarely generates problems as a matter of practice. Because of this, the JPEG algorithm is enabled to reduce the memory capacity necessary for compression and decompression of image data and also for storing compressed image data. The JEPG algorithm contributes to the reduction of time needed for sending and receiving image data. Due to such advantages, the JEPG algorithm has become the most widely used image compression/decompression algorithm at present.

FIG. 2 shows a block diagram illustrating a basic function according to the JPEG 2000 algorithm. As shown, the JPEG 2000 algorithm includes the functions of the following units: a color space transformation/inverse transformation unit 60, a two-dimensional wavelet transformation/inverse transformation unit 61, a quantization/inverse-quantization unit 62, an entropy coding/decoding unit 63, and a tag processing unit 64.

As mentioned above, the image compression/decompression method that is currently most widely used is the JPEG algorithm. However, the demand for high definition for still images continues to grow and it is anticipated that the JPEG algorithm will reach its technical limit sooner or later. For example, problems such as block noise and mosquito noise become noticeable as the definition of the original image becomes higher and thus the image quality degradation of the JPEG files is no longer negligible. In order to cope with such a circumstance, image quality improvement in the regions with a low bit rate, in other words, the regions with a high compression rate, has started to be recognized as the most important task to be dealt with in the image compression/decompression technology development. The JPEG 2000 algorithm is an algorithm that will be able to cope with such a task and it is expected that the JPEG 2000 algorithm will be used in conjunction with the JPEG algorithm, which is currently most widely used, in the near future.

When comparing FIG. 1 and FIG. 2, it can be seen that the difference between the JPEG algorithm and the JEPG 2000 algorithm is the method for transforming the image data into frequency components. The JPEG algorithm employs the discrete cosine transformation (DCT), whereas the JPEG 2000 algorithm employs the discrete wavelet transformation (DWT). The DWT has an advantage over the DCT that the image quality in the high compression regions is high and this is the reason for its adoption in the JEPG 2000 algorithm. Another difference between the JPEG algorithm and the JEPG 2000 algorithm is that the JPEG 2000 algorithm has the tag processing unit 64 for performing code generation in the last phase of the encoding process. In the tag processing unit 64, generation and interpretation of code streams are performed. By means of such code streams, the JPEG 2000 algorithm can realize various convenient functions. For example, FIG. 3A through FIG. 3D each illustrates an example of sub-bands in each decomposition level when the number of decomposition levels applied to the original image tile is three. The compression or decompression processing of the still images can be stopped at any decomposition level corresponding to levels of octave division in the DWT on the block basis as shown in FIG. 3A through FIG. 3D.

As shown in FIG. 1 and FIG. 2, for the input/output unit of the original image, the color space transformation/inverse transformation units 50, 60 are typically connected. These units may perform the transformation from the RGB color system configured from three primary color components of red (R), green (G), and blue (B) or the YMC color system configured from complementary color components of yellow (Y), magenta (M), and cyan (C) into the YCrCb color system or the YUV color system and vice versa.

The following is a description of the JPEG 2000 algorithm.

The definitions of the terms related to JPEG 2000 comply with the JPEG 2000 Unit I Final Draft International Standard (FDIS). The following are the definitions of typical terms used in the JPEG 2000 algorithm.

1. Code-block: A rectangular grouping of coefficients from the same sub-band of a tile-component.
2. Decomposition level: A collection of wavelet sub-bands where each coefficient has the same spatial impact or span with respect to the source component samples. These include the HL, LH, and HH sub-bands of the same two-dimensional sub-band decomposition. For the last decomposition level, LL sub-band is also included.
3. Precinct: A one rectangular region of a transformed tile-component, within each resolution level, used for limiting the size of packets.
4. Layer: A collection of compressed image data from coding passes of one or more code-blocks of a tile-component. Layers have an order for encoding and decoding that must be preserved.
5. Region of interest (ROI): A collection of coefficients that are considered of particular relevance by some user-defined measures.

FIG. 4 shows an example of each color component of a color image divided into tiles. As shown in FIG. 4, generally, the color image is divided into rectangular areas (tiles) $80_t$, $81_t$, and $82_t$, with respect to each color component 80, 81, or 82 (the RGB primary color system is used in this example). Each tile, R00, R01, . . . , R15/G00, G01, . . . , G15/B00, B01, . . . , B15, is regarded as a basic unit when performing the image compression/decompression process. Thus, the image compression/decompression operation is performed individually for each color component and for each tile.

When performing the coding/compression, data of each tile of respective color components are provided to the color space transformation unit 60 shown in FIG. 2. After being color space transformed, the data are provided to the two-dimensional wavelet transform order alteration unit 61 so that the data are processed by the two-dimensional wavelet transform and are spatially divided into frequency bands.

In the above-mentioned FIG. 3A through FIG. 3D, an example of sub-bands in each decomposition level in a case where the number of decomposition levels applied to the original image tile is three is shown. More precisely, the original image tile (0LL) (decomposition level 0 (70)) is obtained by dividing an original image into tiles. The two-dimensional wavelet transformation is applied to the original image tile so as to divide into sub-bands (1LL, 1HL, 1LH, 1HH) of the decomposition level 1 (71) as shown in FIG. 3B. Then, similarly, the two-dimensional wavelet transform is applied to the low-frequency sub-band (1LL) of the decomposition level 1 and is divided into sub-bands (2LL, 2HL, 2LH, 2HH) of the decomposition level 2 (72) as shown in FIG. 3C. Then, similarly, the two-dimensional wavelet transform is applied to the low-frequency sub-band (2LL) of the decomposition level 2 and is divided into sub-bands (3LL, 3HL, 3LH, 3HH) of the decomposition level 3 (73) as shown in FIG. 3D.

In FIG. 3A through FIG. 3D, the sub-bands that are the target of coding in each decomposition level are represented as gray. In the example shown, the target sub-bands are 3HL, 3LH, 3HH, 2HL, 2LH, 2HH, 1HL, 1LH, and 1HH, and the sub-band 3LL will not be coded.

Subsequently, a target bit to be coded is determined in the order of designated coding and a context is created from peripheral bits of the target bit in the quantization unit 62 shown in FIG. 2. The wavelet coefficients, which have undergone the quantization operation, are divided into rectangles called "precincts" with respect to each sub-band. The precincts do not overlap each other. The precincts are introduced so as to effectively use memories during implementation.

FIG. 5 shows an example that illustrates the relationship in concept between the precincts and the code blocks. In this example, an original image 90 is divided into four tiles, i.e. tile $90_{t0}$, tile $90_{t1}$, tile $90_{t2}$, and tile $90_{t3}$, on a decomposition level 1. As shown in FIG. 5, for example, a precinct $90_{p4}$ includes three rectangle areas coincident in spatial position. The same applies to the precinct $90_{p6}$. For purposes of this disclosure, the precincts are allocated with the numbers from 0 to 8 according to the raster order. Furthermore, each precinct is divided into rectangular "code blocks" that do not overlap each other. In this example, there are provided 12 code blocks numbered from 0 to 11. For example, the code block $90_{b1}$ represents the code block number 1. These code blocks are regarded as basic units when performing the entropy coding operation.

In the entropy coding unit 63 shown in FIG. 2, coding with respect to tiles of each component is performed by probability estimation from the target bit and its context. Accordingly, coding is performed on each tile for every color component of the original image. Lastly, the tag processing unit 64 connects all coded data obtained from the entropy coding unit 63 together so as to generate one single code stream, and attaches predetermined tags thereto. FIG. 6 schematically shows an example of a typical structure of a code stream thus obtained. As shown, tag information called a main header 100 is added to the head of the code stream and different tag information called a tile unit header 101 is added to each tile unit configuring the tile. After the tile unit header 101, code data (a bit stream 102) follows. At the tail 103 of the code stream, there is also attached another tag.

When performing decoding/decompression, a process inverse to the coding is performed and the original image data are generated from the above-mentioned code stream of each tile with respect to each component. The process of decoding is briefly described using FIG. 2. The tag processing unit 64 interprets the tag information attached to the code stream, which is input from the exterior; decomposes the code stream into code streams of each tile of each component; and performs decoding processing with respect to every code stream of each tile of each component. The position of each target bit to be decoded is determined according to the order based on the tag information in the code stream. In the reverse quantization unit 62, the context is generated from the periphery bits (which have already been decoded) of the target bit. In the entropy decoding unit

63, decoding is performed in a probability estimation manner from the context thus generated and the code stream, thus the target bit is generated and is written in the thus-determined position.

Since the thus-obtained decoded data are spatially divided with respect to frequency bands, the two-dimensional wavelet inverse transformation is applied to the decoded data in the two-dimensional wavelet transformation unit 61 so as to regenerate/restore each tile of respective color components of the image data. The restored data are transformed into data of the original primary color system by the color space inverse transformation unit 60.

It is possible to directly quantize the wavelet coefficients. However, according to the JPEG 2000 algorithm, in order to improve the coding efficiency, each coefficient value is decomposed into bit plane units. Then, after that, it is possible to order bit planes with respect to each code block or each pixel.

FIG. 7A through FIG. 7G illustrate an example of a procedure for ordering the bit planes. As shown in FIG. 7A, an original image 160 (32×32 pixels) is divided into tile $160_{t0}$, file $160_{t1}$, tile $160_{t2}$, and tile $160_{t3}$, each including 16×16 pixels. In this example, each precinct on a decomposition level 1 has the size of 8×8 pixels and each code block on the same level 1 has the size of 4×4 pixels. The number of each precinct and the number of each code block are given the in order of raster. The mirroring method is applied for the pixel increase on the outside of a file boundary, the wavelet transform is performed by a reversible (5, 3) filter, and thus the wavelet coefficient values on the decomposition level 1 are calculated.

A typical "layer" configuration is readily understandable when the wavelet coefficients values are seen from a lateral direction (a bit plane direction) as shown in FIG. 7D through FIG. 7G. This example is given with respect to the tile $160_{t0}$ (tile 0)/precinct $160_{p3}$ (precinct 3)/code block $160_{b3}$ (code block 3). The code block $160_{w3}$ obtained by applying the wavelet transform to the pixel values shown in FIG. 7B is divided into sub-bands (1LL, 1HL, 1LH, 1HH), and as shown in FIG. 7C, the wavelet coefficient values are obtained with respect to each sub-band.

As shown in FIG. 7D through FIG. 7G, each layer L0 through L3 includes one or a plurality of bit planes. In this example, the layer L0 includes one bit plane, the layer L1 includes three bit planes, the layer L2 includes one bit plane, and the layer L3 includes three bit planes. The layer including bit planes close to the least significant bit (LSB) is to be quantized earlier so that it can be deleted first, whereas a layer including bit planes close to the most significant bit (MSB) is to be quantized later so that it can remain un-quantized longer than the layer including bit planes close to the LSB. The scheme of deleting the layers close to the LSB first is called truncation. By applying such a scheme, it is possible to finely control the quantization rate.

When the conventional JPEG compressing/decompression method is to be applied instead of the JPEG 2000 algorithm, each tile is replaced by a square block having 8 pixels on each side and to which the two-dimensional discrete cosine transform is applied.

So far, the description is given with respect to typical still images. However, the above-described technology may be equally extended to motion images (videos). In other words, each frame of motion images is configured from one still image and a plurality of still images can be created (coded) into video data or can be displayed (decoded) with frame rate appropriate to any application. This is the function called motion compression/decompression processing of still images. Since this method has a function that is not provided to the video files of the MPEG format, which is widely used for motion images, that is to say, this method has an advantageous quality of being able to handle high quality still images with respect to each frame, businesses such as broadcasting stations, etc. have started to express their interest in such a method. There is a good chance that such a method will be widely used among general consumers in the near future.

One specification that is required for the compression/decompression algorithm for motion processing of still images and that differs significantly from the compression/decompression algorithm for general still images is the processing rate. This is because the processing rate determines the frame rate that affects the quality of motion images. At the present, in order to realize such a high processing rate, means are limited to such as application specific integrated circuits (ASIC) and digital signal processors (DSP), which strongly depend on hardware. It appears that in order to realize a processing rate that is sufficiently high with software, developments in process device technology in the semiconductor field and parallel compiling technology in the software field, etc., must be awaited.

However, in the image compression/decompression method according to the related art, there is a disadvantage that both important regions, i.e. the regions of interest (ROI), and the regions not so important are compressed similarly. In view of such a disadvantage, for example, Japanese Laid-Open Patent Application No. 06-350989 discloses an image data compression processing method that divides an image into a plurality of regions, defines a level of importance with respect to each region, and controls the quantization rate of each region according to the defined level of importance. However, the level of importance of respective regions differs depending on the owner of the image and it is not practical to reflect individual requests of the owners of the image. In addition, it is not readily possible to incorporate determining of different quantization rates with respect to each region into the current image compression/decompression devices.

Further, Japanese Laid-Open Patent Application No. 2000-40142 and No. 2001-285642 disclose inventions where priority is given to the data of the regions of interest over the data of the regions other than the regions of interest by performing a bit shift to bits in the region of interest with respect to the bits in the regions other than the regions of interest. However, inventions disclosed in the above-mentioned applications not only fail to finely control the image quality in the regions of interest and the regions other than the regions of interest but also may generate a code indicating that there is no data other than the region of interest when the code size is small.

SUMMARY OF THE INVENTION

Image compression and decompression techniques are disclosed. In one embodiment, an image compression device comprises an image division unit to divide an image into a plurality of regions; a region designation unit to designate a region of interest in the image; a quantization rate determination unit to determine a quantization rate with respect to each of the regions divided by the image division unit; and a compression control unit to control compression with respect to each of the regions based on the quantization rate determined by the quantization rate determination unit. The quantization rate determination unit is operable to determine the quantization rate for the region of interest different from the quantization rate for the regions other than the region of interest.

BRIEF DESCRIPTION OF THE DRAWINGS

FIG. 7A through FIG. 7G schematically show an example of a procedure for ordering bit planes;

FIG. 8 shows a block diagram illustrating a configuration example of an image compression/decompression device for still images according to one embodiment of the present invention;

FIG. 9 shows a block diagram illustrating the detail of a configuration example of an image compression/decompression device according to one embodiment of the present invention;

FIG. 20 shows an example of bit plane division with respect to each tile;

FIG. 24 shows an example of level of interest determination with respect to a tile according to one embodiment of the present invention;

DETAILED DESCRIPTION OF THE PRESENT INVENTION

Figure 1:
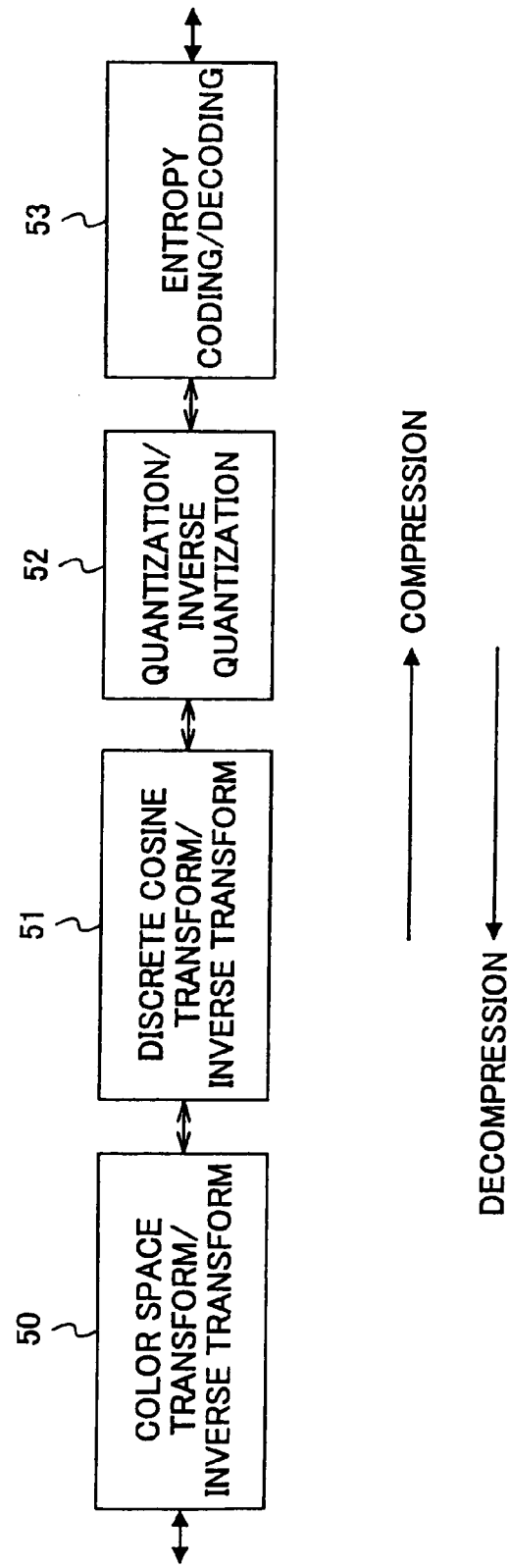
FIG. 1 shows a block diagram illustrating a basic function of the JPEG algorithm.
Figure 2:
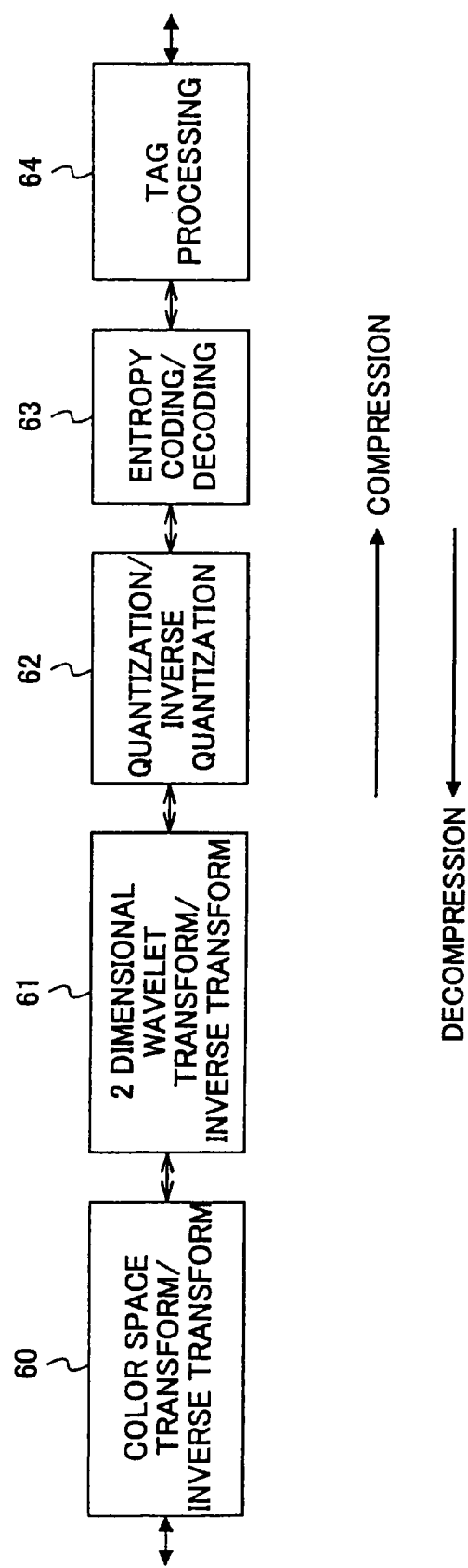
FIG. 2 shows a block diagram illustrating a basic function of the JPEG 2000 algorithm.
Figure 3A:
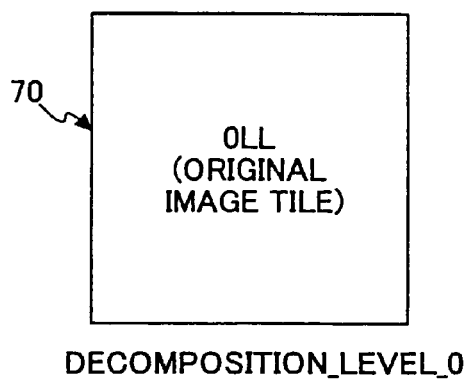
FIG. 3A through FIG. 3D show an example of sub-bands in each decomposition level when the number of decomposition levels is three.
Figure 3B:
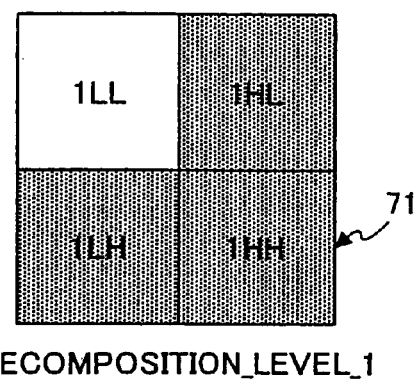
Figure 3C:
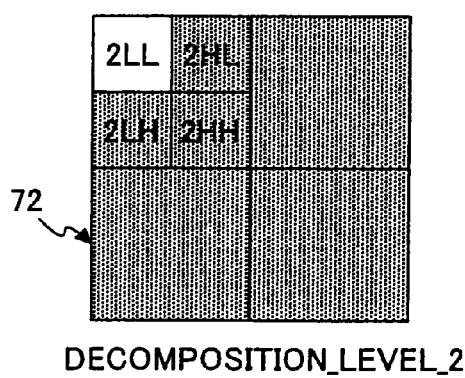
Figure 3D:
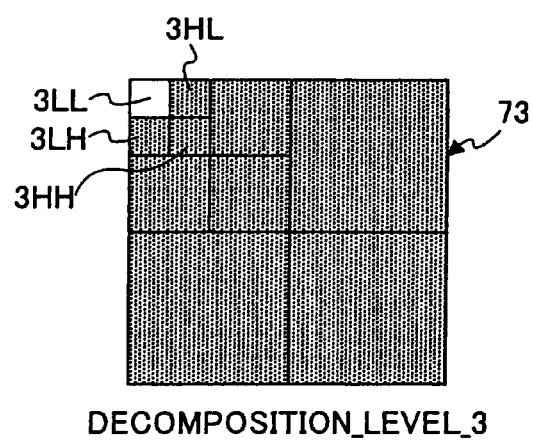

Accordingly, embodiments of the present invention provide an image compression device, an image decompression device, an image compression/decompression device, a computer executable program, and a recording medium storing such a program, all of which being able to identify important regions, i.e. the regions of interest (ROI), in an image by a user and to compress the identified important regions with precision according to the desires from the user.

Another embodiment of the present invention provides an image compression device, an image decompression device, an image compression/decompression device, a computer executable program, and a recording medium storing such a program, all of which being able to finely determine resolution for the ROI and the regions other than the ROI so as to realize high image compression while maintaining high image quality according to the determined resolution and so as to reduce the processing time necessary for the compression.

Another embodiment of the present invention provides an image compression device, an image decompression device, an image compression/decompression device, a computer executable program, and a recording medium storing such a program, all of which being able to perform compression with different precision according to the requirement from the user while reducing the data amount for both the ROI and the regions other than the ROI, to determine level of interest with respect to each determined region so as to control the number of bits to be retained according to the determined level of interest.

As a first aspect of the present invention, there is provided an image compression device which comprises an image division unit to divide an image into a plurality of regions, a region designation unit to designate a region of interest in the image, a quantization rate determination unit to determine a quantization rate with respect to each of the regions divided by the image division unit, and a compression control unit to control compression with respect to each of the regions based on the quantization rate determined by the quantization determination unit.

In the image compression device according to the first aspect of the present invention, the quantization rate determination unit can determine the quantization rate for the region of interest different from the quantization rate for the regions other than the region of interest.

Further, the image compression device according to the first aspect of the present invention may further comprise a level of interest determination unit to determine a level of interest for the region of interest designated by the region designation unit and the quantization rate determination unit may determine a different quantization rate according to the level of interest determined for the region of interest by the level of interest determination unit.

Further, in the image compression device according to the first aspect of the present invention, the image division unit may apply two or more from a unit group of a tile, a precinct, a code block, and a pixel, which units are combined, to divide the image into the plurality of regions.

Further, in the image compression device according to the first aspect of the present invention, the image division unit may apply a region determined according to an area of interest in the image to divide the image into the plurality of regions.

Further, in the image compression device according to the first aspect of the present invention, a boundary of the regions divided by the image division unit may be a boundary of two or more from a group of a tile boundary, a precinct boundary, and a code block boundary.

Further, the image compression device according to the first aspect of the present invention may be configured from a combination of a two-dimensional wavelet transformation unit, a quantization unit, and an entropy coding unit.

As a second aspect of the present invention, there is provided an image compression device which comprises an image division unit to divide an image into a plurality of regions, a region designation unit to designate a region of interest in the image, a bit number determination unit to determine the number of bits, which are available when quantization is made, with respect to each of the regions divided by the image division unit, and a compression control unit to control compression with respect to each of the regions based on the number of bits determined by the bit number determination unit.

In the image compression device according to the second aspect of the present invention, the bit number determination unit can determine the number of bits for the region of interest different from the number of bits for the regions other than the region of interest.

Further, the image compression device according to the second aspect of the present invention may further comprise a level of interest determination unit to determine a level of interest for the region of interest designated by the region designation unit, and the bit number determination unit may determine a different number of bits according to the level of interest determined for the region of interest by the level of interest determination unit.

Further, in the image compression device according to the second aspect of the present invention, the image division unit may apply two or more from a unit group of a tile, a precinct, a code block, and a pixel, which units are combined, to divide the image into the plurality of regions.

Further, in the image compression device according to the second aspect of the present invention, the image division unit may apply a region determined according to an area of interest in the image to divide the image into the plurality of regions.

Further, in the image compression device according to the second aspect of the present invention, a boundary of the regions divided by the image division unit may be a boundary of two or more from a group of a tile boundary, a precinct boundary, and a code block boundary.

Further, the image compression device according to the second aspect of the present invention may be configured from a combination of a two-dimensional wavelet transformation unit, a quantization unit, and an entropy coding unit.

As a third aspect of the present invention, there is provided an image compression device which comprises an image division unit to divide an image into a plurality of regions, a region designation unit to designate a region of interest in the image, a bit plane allocation unit to allocate one or a plurality of bit planes to a layer with respect to each of the regions divided by the image division unit, and a compression control unit to control compression with respect to each of the regions based on the layer allocated with one or a plurality of bit planes.

In the image compression device according to the third aspect of the present invention, the bit plane allocation unit can allocate the number of bit planes to the layer for the region of interest different from the number of bit planes to the layer for the regions other than the region of interest.

Further, the image compression device according to the third aspect of the present invention may further comprise a level of interest determination unit to determine a level of interest for the region of interest designated by the region designation unit, and the bit plane allocation unit may allocate a different number of bit planes to the layer according to the level of interest determined for the region of interest by the level of interest determination unit.

Further, in the image compression device according to the third aspect of the present invention, the image division unit may apply two or more from a unit group of a tile, a precinct, a code block, and a pixel, which units are combined, to divide the image into the plurality of regions.

Further, in the image compression device according to the third aspect of the present invention, the image division unit may apply a region determined according to an area of interest in the image to divide the image into the plurality of regions.

Further, in the image compression device according to the third aspect of the present invention, a boundary of the regions divided by the image division unit may be a boundary of two or more from a group of a tile boundary, a precinct boundary, and a code block boundary.

Further, the image compression device according to the third aspect of the present invention may be configured from a combination of a two-dimensional wavelet transformation unit, a quantization unit, and an entropy coding unit.

As a fourth aspect of the present invention, there is provided an image compression device which comprises an image division unit to divide an image into a plurality of regions, a resolution determination unit to determine the resolution with respect to each of the regions divided by the image division unit, and a compression control unit to control compression with respect to each of the regions based on the resolution determined for each of the regions by the resolution determination unit.

Further, in the image compression device according to the fourth aspect of the present invention, the image division unit may apply more than two from a group of a tile, a precinct, a code block, and a pixel, which units are combine, to divide the image into the plurality of regions.

Further, in the image compression device according to the fourth aspect of the present invention, the image division unit may apply a region determined according to an area of interest in the image to divide the image into the plurality of regions.

Further, in the image compression device according to the fourth aspect of the present invention, a boundary of the regions divided by the image division unit may be a boundary of two or more from a group of a tile boundary, a precinct boundary, and a code block boundary.

Further, the image compression device according to the fourth aspect of the present invention may be configured from a combination of a two-dimensional wavelet transformation unit, a quantization unit, and an entropy coding unit.

As a fifth aspect of the present invention, there is provided an image compression device which comprises an image division unit to divide an image into a plurality of regions, a bit plane decomposition unit to decompose each of the plurality of regions divided by the image division unit into bit planes, a level of interest determination unit determining a level of interest for the decomposed bit planes, and a compression control unit to control compression with respect to each of the regions based on the level of interest determined for the decomposed bit planes by the level of interest determination unit.

In the image compression device according to the fifth aspect of the present invention, a compressed image may be generated according to the level of interest determined for the decomposed bit planes.

As a sixth aspect of the present invention, there is provided an image compression device which comprises an image division unit to divide an image into a plurality of regions, a bit plane decomposition unit to decompose each of the plurality of regions divided by the image division unit into bit planes, a level of interest determination unit to determine a level of interest for the decomposed bit planes, a compression control unit to control compression with respect to each of the regions based on the level of interest determined for the decomposed bit planes by the level of interest determination unit, and tag processing control unit to control tag processing based on the level of interest determined for the decomposed bit planes.

In the image compression device according to the sixth aspect of the present invention, a compressed image may be generated according to the level of interest determined for the decomposed bit planes.

As a seventh aspect of the present invention, there is provided an image decompression device for decompressing an image compressed by the image compression device according to the first aspect of the present invention, and the compressed image is decompressed based on information of each of the regions divided by the image division unit, which information is contained in the compressed image.

The image decompression device according to the seventh aspect of the present invention may be configured from a combination of a two-dimension inverse wavelet transformation unit, an inverse quantization unit, and an entropy decoding unit.

As an eighth aspect of the present invention, there is provided an image decompression device for decompressing an image compressed by the image compression device according to the second aspect of the present invention, and the compressed image is decompressed based on information of each of the regions divided by the image division unit, which information is contained in the compressed image.

The image decompression device according to the eighth aspect of the present invention may be configured from a combination of a two-dimension inverse wavelet transformation unit, an inverse quantization unit, and an entropy decoding unit.

As a ninth aspect of the present invention, there is provided an image decompression device for decompressing an image compressed by the image compression device according to the third aspect of the present invention, and the compressed image is decompressed based on information of each of the regions divided by the image division unit, which information is contained in the compressed image.

The image decompression device according to the ninth aspect of the present invention may be configured from a combination of a two-dimension inverse wavelet transformation unit, an inverse quantization unit, and an entropy decoding unit.

As a tenth aspect of the present invention, there is provided an image decompression device for decompressing an image compressed by the image compression device according to the fourth aspect of the present invention, and the compressed image is decompressed based on information of each of the regions divided by the image division unit, which information contained in the compressed image.

The image decompression device according to the tenth aspect of the present invention may be configured from a combination of a two-dimension inverse wavelet transformation unit, an inverse quantization unit, and an entropy decoding unit.

As an eleventh aspect of the present invention, there is provided an image compression/decompression device which comprises the image compression device according to the first aspect of the present invention and the image decompression device according to the seventh aspect of the present invention. The functions of the image compression device and the image decompression device are may be realized by a combination of a two-dimensional wavelet transformation/inverse transformation unit, a quantization/inverse quantization unit, and an entropy coding/decoding unit.

As a twelfth aspect of the present invention, there is provided an image compression/decompression device which comprises the image compression device according to the second aspect of the present invention and the image decompression device according to the eighth aspect of the present invention. The functions of the image compression device and the image decompression device are may realized by a combination of a two-dimensional wavelet transformation/inverse transformation unit, a quantization/inverse quantization unit, and an entropy coding/decoding unit.

As a thirteenth aspect of the present invention, there is provided an image compression/decompression device which comprises the image compression device according to the third aspect of the present invention and the image decompression device according to the ninth aspect of the present invention. The functions of the image compression device and the image decompression device are may realized by a combination of a two-dimensional wavelet transformation/inverse transformation unit, a quantization/inverse quantization unit, and an entropy coding/decoding unit.

As a fourteenth aspect of the present invention, there is provided an image compression/decompression device which comprises the image compression device according to the fourth aspect of the present invention and the image decompression device according to the tenth aspect of the present invention. The functions of the image compression device and the image decompression device are may be realized by a combination of a two-dimensional wavelet transformation/inverse transformation unit, a quantization/inverse quantization unit, and an entropy coding/decoding unit.

As a fifteenth aspect of the present invention, there are provided programs for executing on a computer to perform functions of the respective image compression/decompression devices mentioned above.

As a sixteenth aspect of the present invention, there are provided computer readable recording media each storing such a program mentioned above.

Therefore, according to the present invention, it is possible to provide an image compression device, an image decompression device, an image compression/decompression device, a computer executable program, and a recording medium storing such a program, all of which being able to determine important regions, i.e. the regions of interest (ROI), in an image by a user and to compress the determined important regions with precision according to the requirement from the user.

In the following, principles and embodiments of the present invention will be described with reference to the accompanying drawings.

FIG. 8 shows a block diagram illustrating a configuration example of an image compression/decompression device for still images according to one embodiment of the present invention. As shown in FIG. 8, the image compression/decompression device according to the embodiment of the present invention includes a color space transformation/inverse transformation unit 10, a first component 11, a second component 12, a third component 13, a code stream processing unit 14, and a quantization rate determination unit 15. The first component 11 is configured from a wavelet transformation/inverse transformation unit 11a, a quantization rate selecting unit 11b, a quantization/inverse quantization unit 11c, and an entropy coding/decoding unit 11d. The second component 12 is configured from a wavelet transformation/inverse transformation unit 12a, a quantization rate selecting unit 12b, a quantization/inverse quantization unit 12c, and an entropy coding/decoding unit 12d. The third component 13 is configured from a wavelet transformation/inverse transformation unit 13a, a quantization rate selecting unit 13b, a quantization/inverse quantization unit 13c, and an entropy coding/decoding unit 13d.

It is noted that in the image compression/decompression device shown in FIG. 8, although the transformation and the inverse transformation of respective processing are represented as a single block so as to cope with both compression and decompression, it is possible to allocate different blocks for the transformation and the inverse transformation, respectively. By doing so, it is possible to make use of an independent image compression device and an independent image decompression device. Also, the compressed images to be decompressed by the image compression/decompression device or the image decompression device according to one embodiment of the present invention are not limited to the images compressed by the image compression device according to the present invention, but also include any compressed images in general that have been compressed by controlling the compression rate with respect to each region divided from an original image based on quantization rate, which is determined with respect to each divided region.

According to one embodiment of the present invention, since the method that employs the discrete wavelet transformation of the JPEG 2000 algorithm is introduced into practical device configurations in order to realize the image compression/decompression method, the present invention can be continuously utilized from the present to the future.

The above described image compression/decompression device shown in FIG. 8 is for still images. The processes in the first component 11, the second component 12, and the third component 13 are performed in parallel. The color space used in this embodiment is either RGB or YUV.

The following is a description of compression. First, the original image is transformed into RGB or YUV color space in the color space transformation/inverse transformation unit 10. The following processing is carried out in parallel in the first component 11, the second component 12, and the third component 13. Here, a description is given for the processing in the first component 11. However, the same processing is performed in the second component 12 and the third component 13. The image having color space transformed is divided into a plurality of tile regions. The wavelet transformation/inverse transformation unit 11a performs the wavelet transformation with respect to each tile region. At this time, the divided regions are divided using tiles and as for precincts and code blocks, the region division is performed after the wavelet transformation processing is performed. It is also possible to perform region division by combining the tiles, the precincts, and the code blocks.

In the quantization rate selecting unit 11b, the quantization rate is selected with respect to each region having the wavelet transformation performed thereon. When the user designates the region of interest (ROI) and the quantization rate is determined with respect to each region, the ROI is designated in the image and it is possible to determine the quantization rate for the designated ROI, which differs from that for regions other than the ROI, in the quantization rate determination unit 15. After the quantization rates for respective regions of the image are thus determined, the wavelet coefficients are provided to the quantization/inverse quantization unit 11c so as to be quantized. After the quantization, entropy coding is performed in the entropy coding/decoding unit 11d. Lastly, the code streams are generated in the code stream processing unit 14.

According to the present invention, since the quantization rate is determined according to the regions selected by the user and since the compression is controlled based on the determined quantization rate, it is possible to realize image compression that suits individual users' tastes.

FIG. 9 shows a block diagram illustrating the details of a configuration example of the image compression/decompression device according to one embodiment of the present invention. In FIG. 9, the image compression/decompression device 20 includes a color space transformation/inverse transformation unit 20a, a two dimensional wavelet transformation/inverse transformation unit 20b, a quantization/inverse quantization unit 20c, an entropy coding/decoding unit 20d, and a tag processing unit 20e. In FIG. 9, there is further provided image division unit 21, compression control unit 22, quantization rate determination unit 23, and region designation unit 24. The compression/decompression device 20 performs the same processing as that of each component shown in FIG. 8. The tag processing unit 20e is added to the device as a characteristic of the JPEG 2000 algorithm, and it generates and interprets code streams.

The original image is divided into a plurality of regions by the image division unit 21 after being color space transformed in the color space transformation/inverse transformation unit 20a. When dividing the original image, the tiles, the precincts, and the code blocks may be used. It is also possible to divide the original image using a combination of two or a combination of the three. In addition, it is also possible to designate areas of interest in the image and determine the ROI according to the areas of interest in the image, and then divide the image according to the determined ROI. In such a case, the boundary of the divided regions may be one of tile boundary, precinct boundary, or code block boundary, or two or three of the mentioned boundaries according to the division unit of the region.

According to one embodiment of the present invention, by using the tiles, the precincts, and the code blocks, which will be the standard specifications for the JPEG 2000 algorithm, for dividing the image into a plurality of regions, it is possible to readily realize compression control.

The region designation unit 24 designates the ROI in the image. More specifically, for example, the range of an area of interest in the image displayed on the display screen, etc., is designated by using input means such as a mouse or a keyboard, etc., and the designated area of interest can be determined as the ROI. More than one ROI can be designated. As another way of designating the ROI, it is possible to designate some of the regions divided using the tiles, the precincts, or the code blocks as the ROI. In such a case, for example, numbers may be allocated to each region divided from the image displayed on the display screen, etc., and the ROI can be designated by inputting relevant numbers corresponding to the ROI by the mouse or the keyboard, etc. Again, in this case, more than one ROI can be designated.

According to one embodiment of the present invention, since when dividing the original image into a plurality of regions, the original image is divided according to the regions determined by the user, it is possible to effectively control the image compression. Further, by using the tile, the precinct, and the code block, which will be standard specifications for the JPEG 2000 algorithm for dividing the image into a plurality of regions, it is possible to readily realize compression control.

The quantization rate determination unit 23 determines the quantization rate with respect to each region. More specifically, a level of interest is given to the ROI designated in the region designation unit 24. The term "level of interest" used here indicates a measure for controlling the compression rate for the ROI in the image. For example, for regions desired to be high definition, the quantization rate is reduced. The level of interest can be appropriately determined according to the users' tastes with respect to each ROI by using level of interest determination means, which will be described later. By determining different quantization rates according to the level of interest determined by the user, it is possible to control compression while maintaining image quality precision. As an embodiment that is often used, two types of quantization rates are determined for the divided regions. In such a case, the quantization rates may be determined so that the ROI and the region other than the ROI have different quantization rates. In other words, when the quantization rate for the ROI is higher than that for the regions other than the ROI, the image quality of the ROI will be coarse. When the quantization rate for the ROI is lower than that for the regions other than the ROI, the image quality of the ROI will be high definition. Consequently, it is possible to appropriately determine the quantization rate according to the users' tastes.

According to one embodiment of the present invention, by determining a plurality of quantization rates according to the level of interest determined for the ROI, it is possible to control the compression while maintaining the high definition image quality of the image. Further, since at least two quantization rates are employed for the regions divided from the image, it is possible to readily realize compression control that reflects the users' tastes with a simple configuration.

The compression control unit 22 controls the compression with respect to each region based on the determined quantization rate. The compression-controlled regions are provided to the quantization/inverse quantization unit 20c so as to be quantized based on the quantization rate. Then the entropy coding is performed in the entropy coding/decoding unit 20d and code stream processing is performed in the tag processing unit 20e.

Figure 10:
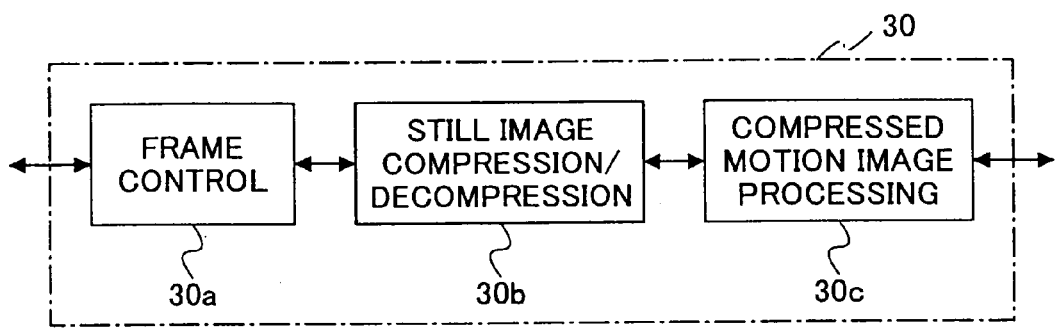
FIG. 10 shows a block diagram illustrating a configuration example of an image compression/decompression device for motion images according to one embodiment of the present invention.

FIG. 10 shows a block diagram illustrating a configuration example of the image compression/decompression device for motion images according to one embodiment of the present invention. In FIG. 10, the image compression/decompression device 30 includes frame control unit 30a, still image compression/decompression unit 30b, and compressed motion image processing unit 30c. When the motion image compression/decompression device 30 receives motion images (video), the frame control unit 30a performs the frame control and provides the motion images with respect to each frame to the still image compression/decompression unit 30b. The still image compression/decompression unit 30b performs the compression and decompression of the still images as shown in FIG. 9. The compressed images are provided to the compressed motion image processing unit 30c so as to generate compressed motion images. A plurality of still image compression/decompression unit 30b may be provided so as to improve the processing rate. The quantization rate for each region can be determined for all images, can be determined when there is a change, or can be determined by automatically detecting the displacement of the target from difference data between the frames, etc.

Figure 11:
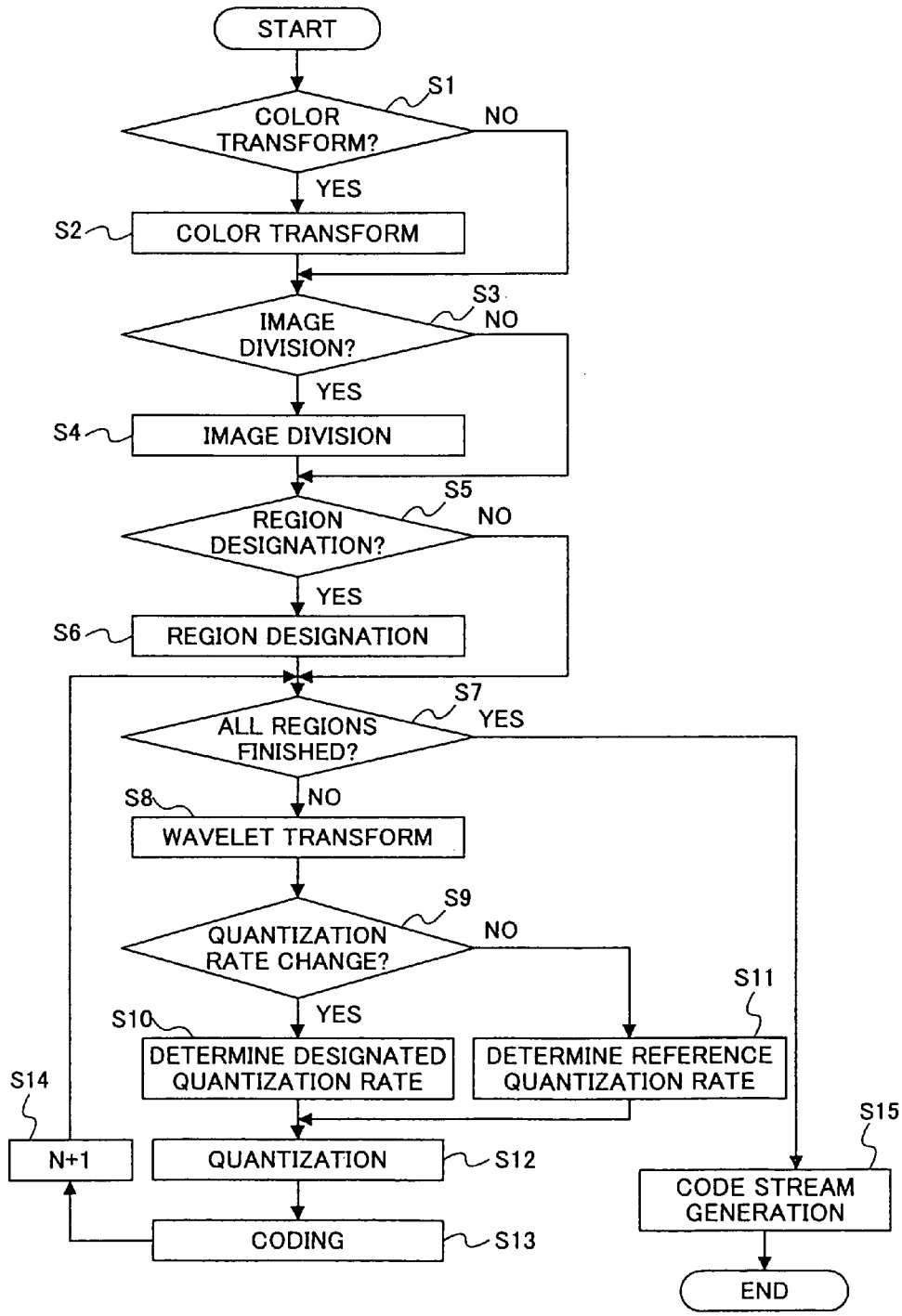
FIG. 11 shows a flow chart illustrating an example of an image compression method according to one embodiment of the present invention.

FIG. 11 shows a flow chart illustrating an example of an image compression method according to one embodiment of the present invention. In the present example, the description will be given to the case in which the original image is divided into a plurality of regions by using tiles; however, the same processing can be applied to the cases where the image division is performed by using precincts or code blocks. First, when the image compression/decompression device according to one embodiment of the present invention receives an input image, it is determined whether color space transformation into RGB or YUV, etc., is to be performed or not according to the color space of the input image (step S1). When it is determined that the color space transformation is necessary (YES), the color space transformation is performed (step S2). When it is determined the that color space transformation is not necessary (NO), for example, when the input image is already color space transformed or when the input image is to be compressed without performing the color space transformation, step S2 is skipped. Next, it is determined whether the input image is to be divided into a plurality of regions or not (step S3). As for determination of image division, for example, the division may be automatically performed according to the size of the image or a user may provide a command to perform the division, etc. When it is determined that the image division is necessary (YES), the image division is performed (step S4). In the present example, the image division is performed by using the tiles. When it is determined that the image division is not necessary (NO), step S4 is skipped.

Next, it is determined whether designating the regions of interest (ROI) in the input image is to be performed or not (step S5). When it is determined that the designating of the ROI is to be performed (YES), the ROI in the input image is designated (step S6). More precisely, the range of an area of interest in the image displayed on the display screen, etc., is designated using input means such as a mouse or a keyboard, etc., and the ROI can be designated according to the designated area of interest. The number of the ROI can be more than one. As another way of designating the ROI, it is possible to designate the ROI from the regions divided using the tiles, the precincts, or the code blocks. In such a case, for example, numbers may be allocated to each region divided from the image displayed on the display screen, etc., and the ROI can be designated by inputting relevant numbers corresponding to the ROI by the mouse or the keyboard. When it is determined that the designating of the ROI is not to be performed, step S6 is skipped.

Next, it is determined whether processing is finished for all regions or not (step S7). When it is determined that the processing is not finished for all regions (NO), the wavelet transformation is performed with respect to each divided region (step S8). The wavelet transformation may be performed in step S4 after the input image is divided into tiles. As for the precincts and the code blocks, the region dividing of the image is performed after the wavelet transformation is applied. Next, it is determined whether it is necessary to change the quantization rate or not (step S9). When it is determined that the quantization rate needs to be changed and the quantization rate is determined with respect to each region by the user (YES), the quantization rate is determined for the relevant divided regions (step S10). When the quantization rate is not determined with respect to each region by the user (NO), a reference quantization rate is determined with respect to each region (step S11).

Next, quantization is performed according to the determined quantization rate (step S12). When the quantization is finished, coding is performed (step S13). When the coding is finished, a counter for counting the number of divided regions is incremented (step S14) and the process returns to step S7. The process from step S7 through step S14 is repeatedly performed until all divided regions are processed. When the process is finished with respect to all divided regions (step S7, YES), the process ends.

Figure 4:
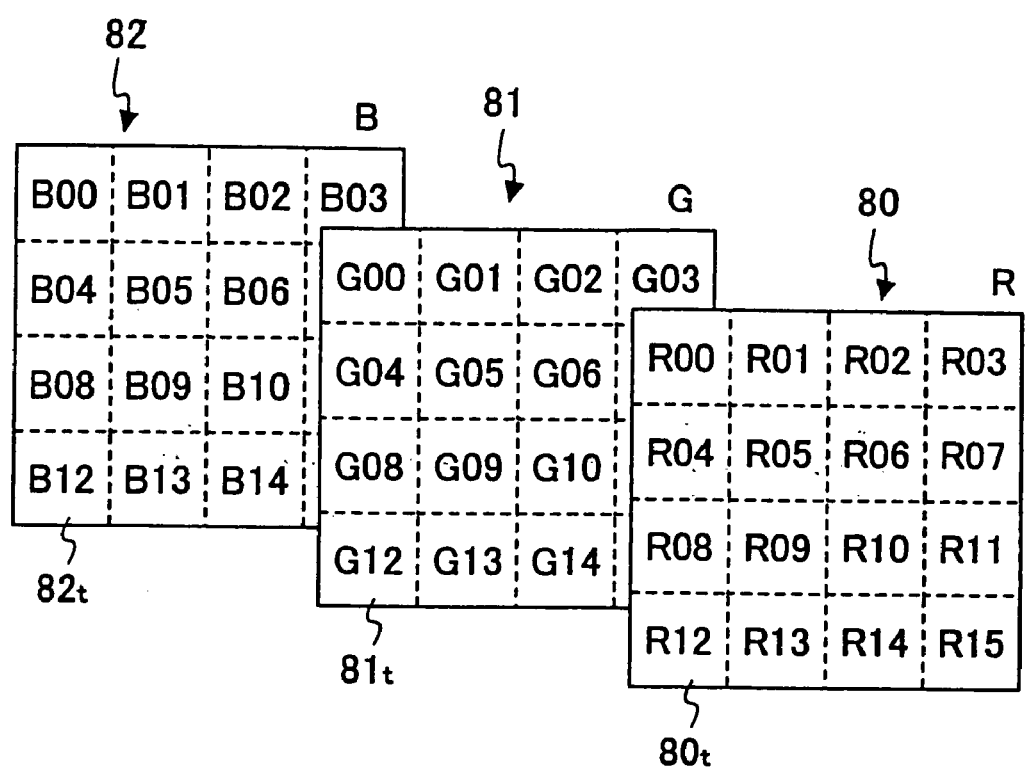
FIG. 4 shows an example of each color component of a color image divided into tiles.
Figure 5:
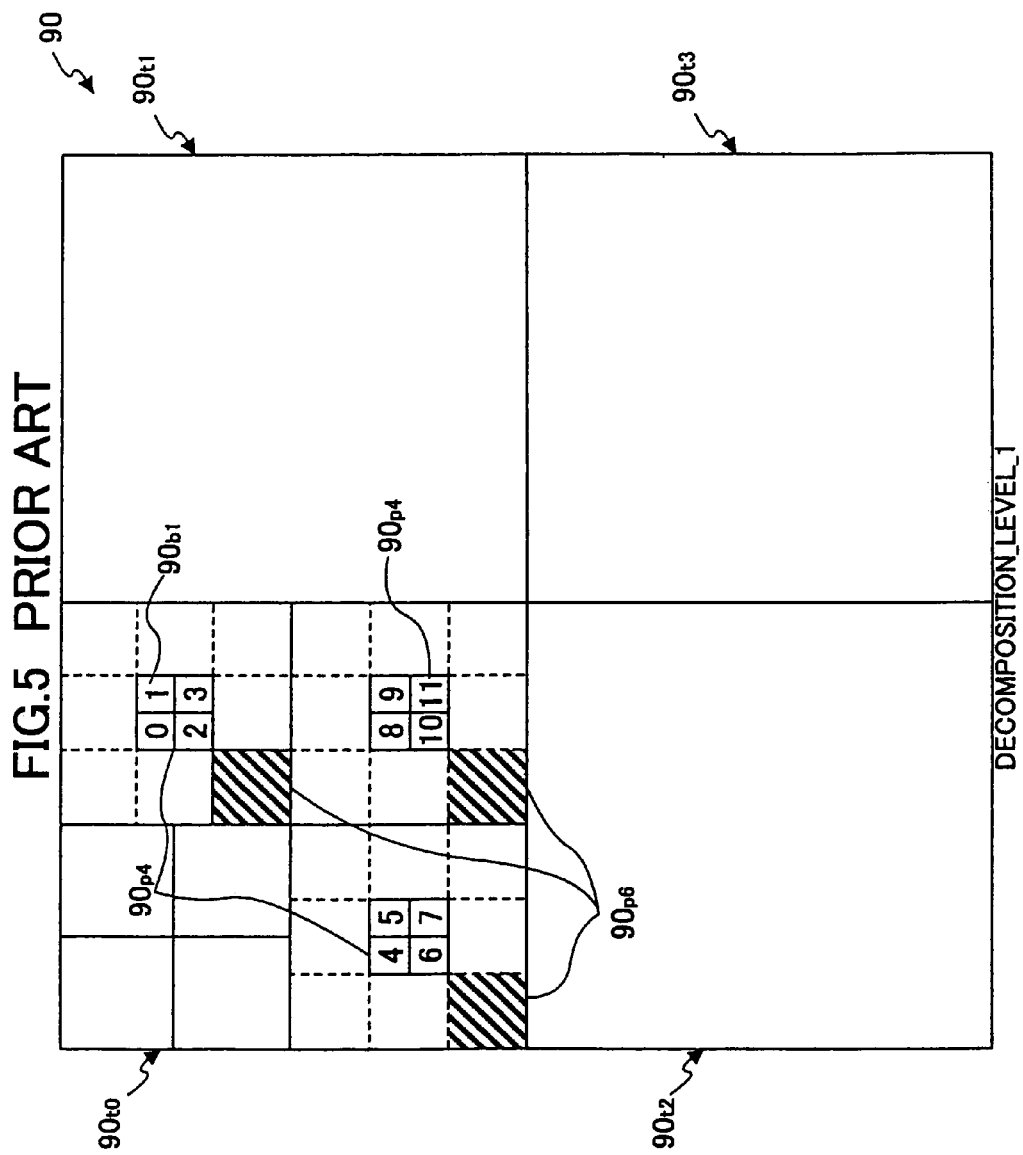
FIG. 5 shows an example that illustrates a relationship between precincts and code blocks.
Figure 6:
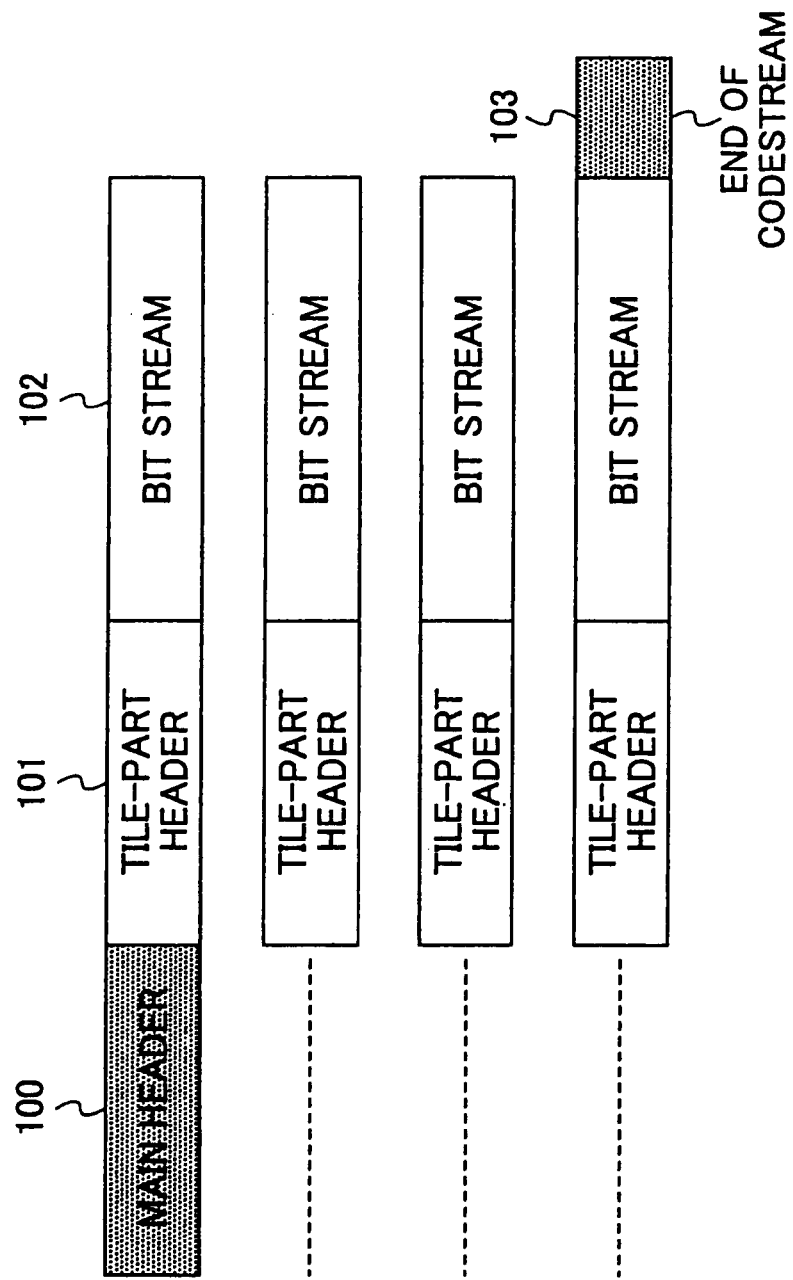
FIG. 6 schematically shows an example of a code stream structure.
Figures 12A, 12B:
FIG. 12A and FIG. 12B show embodiments to which one embodiment of the present invention is applied with respect to a still grayscale image.

FIG. 12A and FIG. 12B show embodiments in which the present invention is applied to a still grayscale image. A description is given to the case when the quantization rate for regions including the human face shown in FIG. 12A is determined low. The regions including the human face are determined as the ROI and the division unit for dividing the image is a tile. As shown in FIG. 12A, the original image 40 is divided into a plurality of tiles and as shown in FIG. 4, each tile is provided with a number according to the raster order from 0 to 15. By making the quantization rate low for the relevant tiles having numbers 5, 6, 9, and 10, which correspond to the black portion 41 shown in FIG. 12B, it is possible to realize a high compression rate of the original image 40 while maintaining high definition for regions including the human face.

Figure 13A:
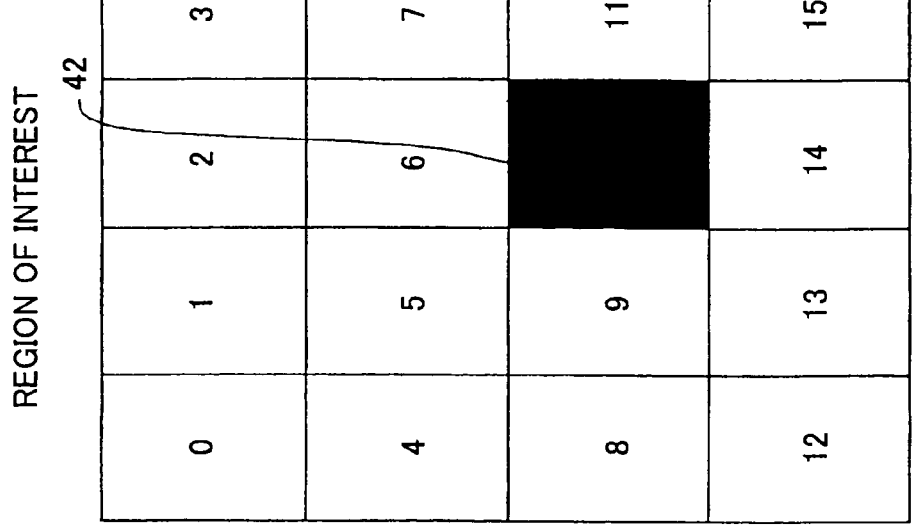
FIG. 13A and FIG. 13B show other embodiments to which one embodiment of the present invention is applied for a still grayscale image.
Figure 13B:
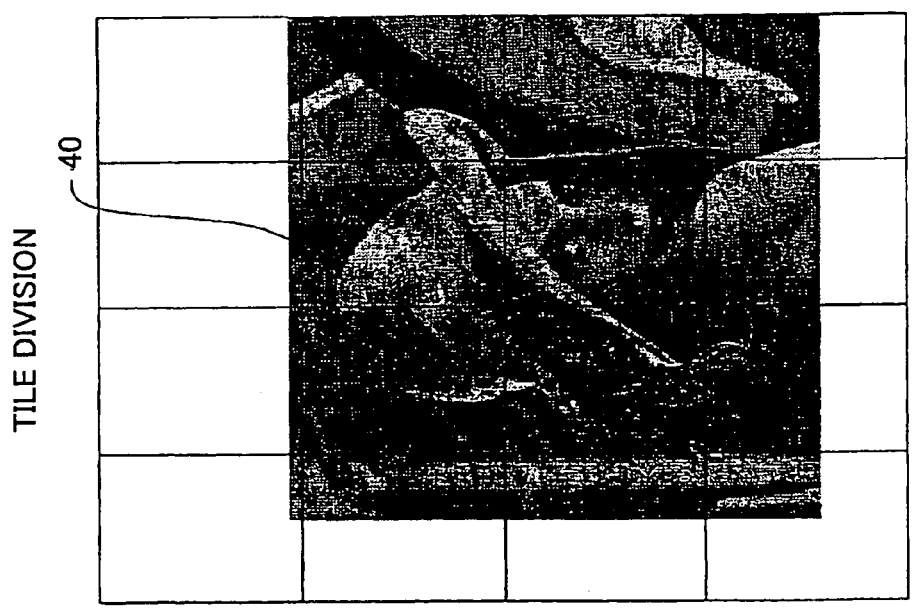

FIG. 13A and FIG. 13B show other embodiments to which the present invention is applied for the still grayscale image. A description is given for the image region dividing when the user designates the portion of the human face shown in FIG. 13A as the ROI and desires to differentiate the quantization rate for the ROI from the regions other than the ROI. In the present embodiments, the division unit for dividing the image is the tile. By determining the tile size so as to cover the human face shown in the original image 40, it is possible to effectively control the compression. In the present embodiments, by reducing the quantization rate only for the tile having the number 10 that corresponds to the black portion 42 shown in FIG. 13B, it is possible to perform high compression of the original image 40. Obviously, it is possible to use a plurality of files instead of one file in order to cover the human face portion.

Figure 14B:
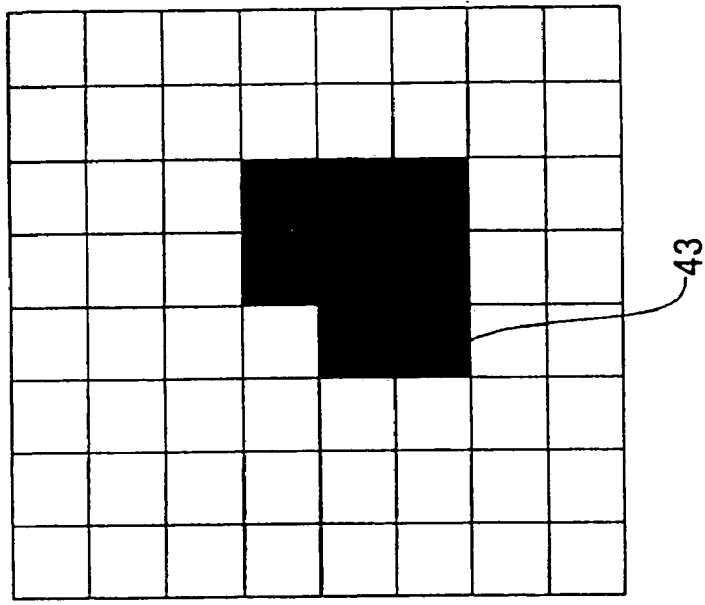
FIG. 14A and FIG. 14B show examples in which precincts are applied for region division.
Figure 14A:

FIG. 14A and FIG. 14B show examples in which the precincts are applied for region division of the original image. Similar to the examples using files for the region dividing described with respect to FIG. 12A and FIG. 12B, a description is given for the case when the quantization rate for regions including the human face shown in FIG. 14A are determined low as the ROI. In the present example, the division unit for dividing the image is the precinct. As shown in FIG. 14A, the original image 40 is divided into a plurality of precincts. By making the quantization rate low for the relevant precincts that correspond to the black portion 43 shown in FIG. 14B, it is possible to realize a high compression rate of the original image 40 while maintaining high definition for regions including the human face.

Figure 15B:
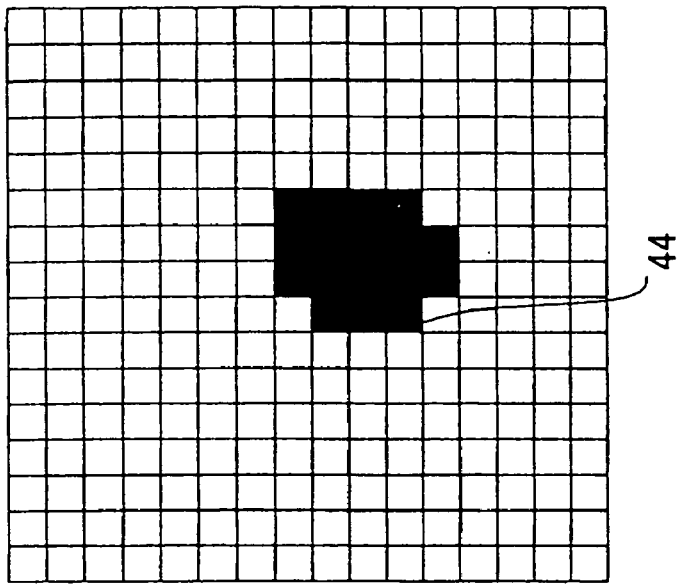
FIG. 15A and FIG. 15B show examples in which code blocks are applied for region division.
Figure 15A:

FIG. 15A and FIG. 15B show examples in which the code blocks are applied for region division of the original image. Similar to the examples using tiles for the region dividing described with respect to FIG. 12A and FIG. 12B, a description is given for the case when the quantization rate for regions including the human face shown in FIG. 15A is determined low as the ROI. In the present example, the division unit for dividing the image is the code block. As shown in FIG. 15A, the original image 40 is divided into a plurality of code blocks. By making the quantization rate low for the relevant code blocks that correspond to the black portion 44 shown in FIG. 15B, it is possible to realize a high compression rate of the original image 40 while maintaining high definition for regions including the human face.

In the above-described embodiments, the method for reducing the quantization rate, e.g., the quantization step size, is not specifically described. However, it is possible to make the quantization rate fixed to a certain value or to set the quantization step size to 1, in other words, to perform lossless coding.

Figure 16:
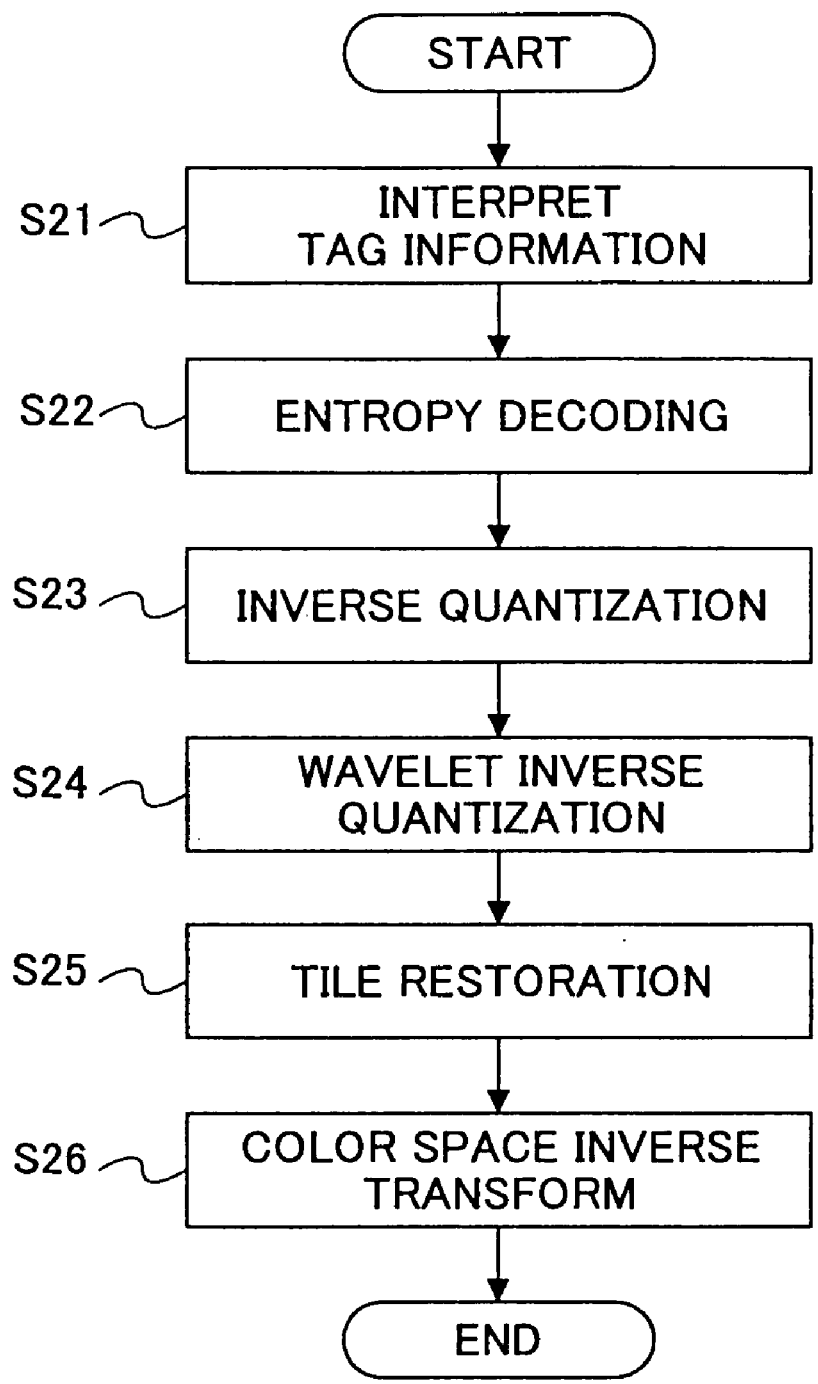
FIG. 16 shows a flow chart illustrating an image decompression method related to one embodiment according to the present invention.

FIG. 16 shows a flow chart illustrating an image decompression method related to one embodiment of the present invention. First, based on the tile division information of the compressed image, the interpretation of the tag information is performed (step S21). Then, sequentially, the entropy decoding (step S22), the inverse-quantization (step S23), and the wavelet inverse-transformation (step S24) are performed so as to restore the compressed image into tiles (step S25). The restored tiles are integrated and the color space inverse transformation is applied to the integrated tiles (step S26) so as to generate the decompressed image. The compressed images to be decompressed by the image decompression method described in FIG. 16 include: compression images being compressed by controlling the compression with respect to each region divided from the original image based on the quantization rate, which is determined with respect to each region; compression images being compressed by controlling the compression with respect to each region divided from an original image based on the bit plane division for layers, which is determined with respect to each region; compression images being compressed by controlling the compression with respect to each region divided from an original image based on the level of interest, which is determined for bit planes decomposed from the divided regions; and compression images being compressed by controlling the compression with respect to each region divided from the original image according to the resolution, which is determined with respect to each region.

According to the present invention, it is possible to decompress the images compressed by image compression devices. Further, it is possible to decompress the images compressed by controlling the compression with respect to each region divided from the original image based on the quantization rate, which is determined with respect to each region. Further, it is possible to decompress the images compressed by controlling the compression with respect to each region divided from the original image based on the bit plane division, which is determined with respect to each region. Further, it is possible to decompress the images compressed by controlling the compression rate with respect to each region divided from an original image based on the level of interest, which is determined for bit planes with respect to each divided region. Further, it is possible to decompress the image compressed by controlling the compression rate with respect to each region divided from the original image according to the resolution, which is determined with respect to each region.

Figure 17:
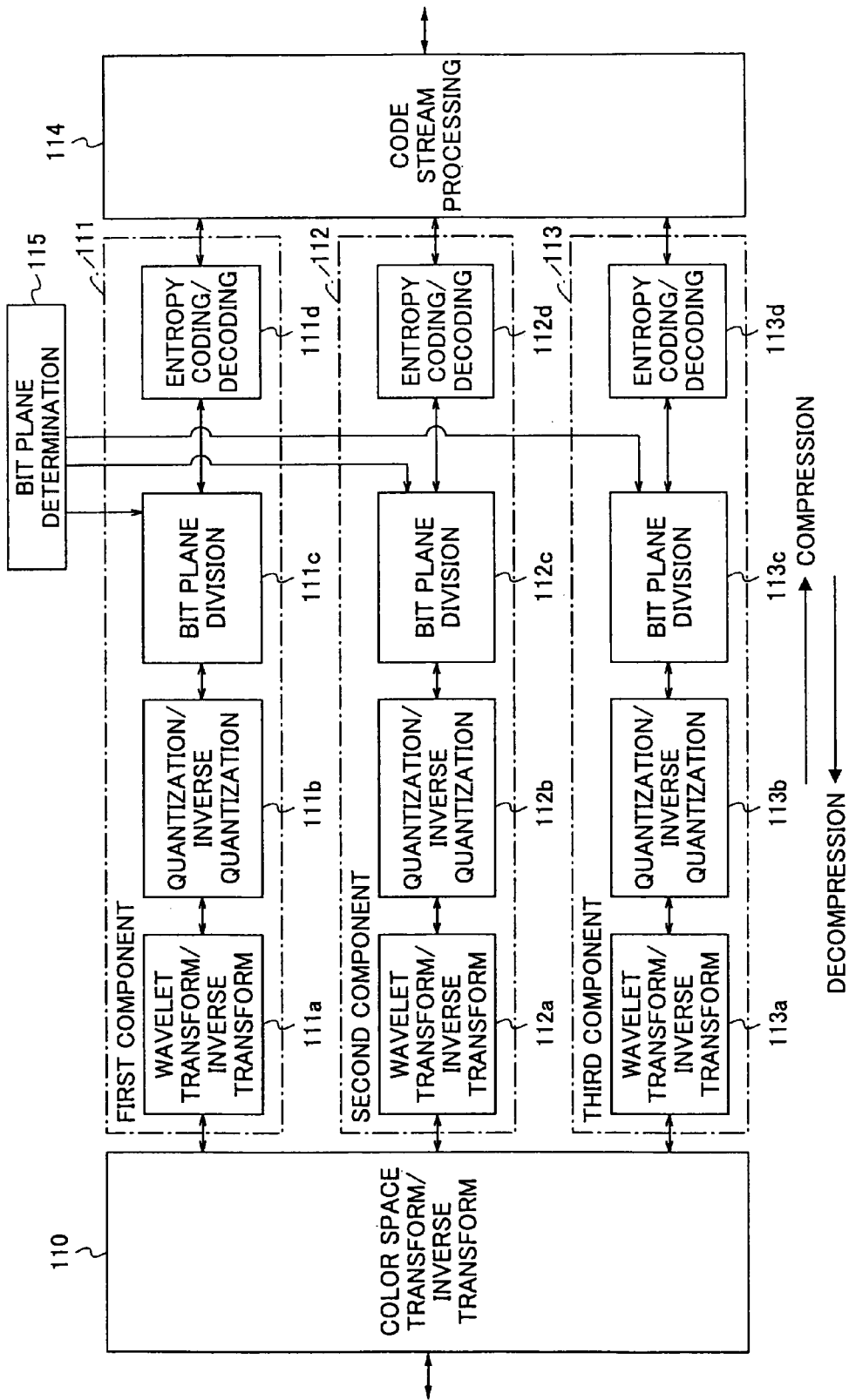
FIG. 17 shows a block diagram illustrating another configuration example of an image compression/decompression device for still images according to one embodiment of the present invention.

FIG. 17 shows a block diagram illustrating another configuration example of an image compression/decompression device for still images according to one embodiment of the present invention. As shown in FIG. 17, the image compression/decompression device according to the embodiment of the present invention includes a color space transformation/inverse transformation unit 110, a first component 111, a second component 112, a third component 113, a code stream processing unit 114, and the bit plane determination unit 115. The first component 111 is configured from a wavelet transformation/inverse transformation unit 111a, a quantization/inverse quantization unit 111b, a bit plane division unit 111c, and an entropy coding/decoding unit 111d. The second component 112 is configured from a wavelet transformation/inverse transformation unit 112a, a quantization/inverse quantization unit 112b, a bit plane division unit 112c, and an entropy coding/decoding unit 112d. The third component 113 is configured from a wavelet transformation/inverse transformation unit 113a, a quantization/inverse quantization unit 113b, a bit pane division unit 113c, and an entropy coding/decoding unit 113d.

It is noted that in the image compression/decompression device shown in FIG. 17, although the transformation and the inverse transformation of respective processing are represented as a single block so as to cope with both compression and decompression, it is possible to allocate different blocks for the transformation and the inverse transformation, respectively. By doing so, it is possible to make use of an independent image compression device and an independent image decompression device. Also, the compressed images to be decompressed by the image compression/decompression device or the image decompression device according to the present invention are not limited to the images compressed by the image compression device according to the present invention, but also include any compression images in general that have been compressed by controlling the compression with respect to each region divided from an original image based on the bit plane divisions, which are determined with respect to each divided region.

The above mentioned image compression/decompression device is for still images. Identical processes in the first component 111, the second component 112, and the third component 113 are performed in parallel. The color space used in this embodiment is either RGB or YUV.

The following is a description of compression. First, the original image is transformed into RGB or YUV color space in the color space transformation/inverse transformation unit 110. The following processing is carried out in parallel in the first component 111, the second component 112, and the third component 113. Here, a description is given for the processing in the first component 111. However, the same processing is performed in the second component 112 and the third component 113. The image having color space transformed is divided into a plurality of tile regions. The wavelet transformation/inverse transformation unit 111a performs the wavelet transformation with respect to each tile region. Next, in the quantization/inverse-quantization unit 111b, the wavelet transformed coefficients are quantized.

In the bit plane division unit 111c, bit planes configured from the quantized wavelet coefficients are divided with respect to each tile region. When the user designates the ROI and the bit plane division is performed with respect to each region, the ROI is designated in the image and it is possible to determine bit plane division for the designated ROI, which differs from that for regions other than the ROI, in the bit plane determination unit 115. After the bit plane division for respective regions is thus determined, the wavelet coefficients are entropy coded in the entropy coding/decoding unit 111d. In the present embodiment, the image may be divided using the tiles, the precincts, or the code blocks. Alternatively, it is possible to divide the image into a plurality of regions using the combination of the tiles, the precincts, and the code blocks. Lastly, the code streams are generated in the code stream processing unit 114.

According to the present invention, since the bit plane division is determined according to the regions selected by the user and since the compression is controlled based on the determined bit plane division, it is possible to realize image compression that suits individual users' tastes. Also, by determining a plurality of bit plane divisions according to the level of interest determined for the ROI, it is possible to control the compression while maintaining image quality precision.

Figure 18:
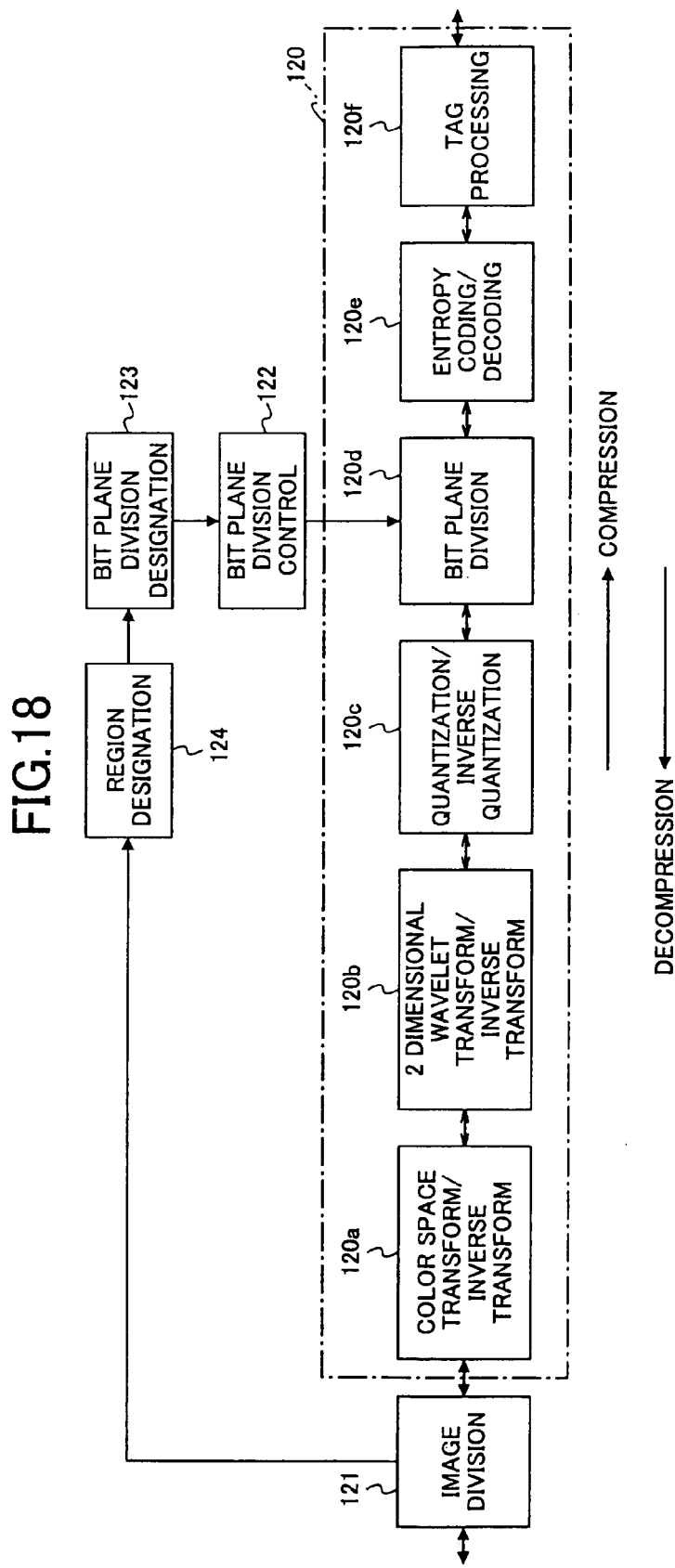
FIG. 18 shows a block diagram illustrating the details of another configuration example of an image compression/decompression device according to one embodiment of the present invention.

FIG. 18 shows a block diagram illustrating the details of another configuration example of the compression/decompression device according to one embodiment of the present invention. In FIG. 18, the image compression/decompression device 120 includes a color space transformation/inverse transformation unit 120a, a two-dimensional wavelet transformation/inverse transformation unit 120b, a quantization/inverse quantization unit 120c, a bit plane division unit 120d, an entropy coding/decoding unit 120e, and a tag processing unit 120f. In FIG. 18, there are also provided image division unit 121, bit plane division control unit 122, bit plane division designating unit 123, and region designation unit 124. The compression/decompression device 120 performs processing similar to that of each component shown in FIG. 17. The tag processing unit 120f is added to the device as a characteristic of the JPEG 2000 algorithm, and it generates and interprets code streams.

The original image is divided into a plurality of regions by the image division unit 121 after being color space transformed in the color space transformation/inverse transformation unit 120a, being two-dimensional wavelet transformed in the two-dimensional wavelet transformation/inverse transformation unit 120b, and being quantized based on the quantization rate in the quantization/inverse quantization unit 120c. When dividing the original image into a plurality of regions, the tiles, the precincts, or the code blocks may be used. It is also possible to divide the original image using a combination of two or a combination of the three. In addition, it is possible to designate areas of interest in the original image and determine the ROI according to the areas of interest, and then divide the image according to the determined ROI. In such a case, the boundary of the divided regions may be one of tile boundary, precinct boundary, or code block boundary, or two or three of the mentioned boundaries according to the division unit of the region.

The region designation unit 124 designates the ROI in the image. More specifically, for example, the range of an area of interest in the image displayed on the display screen, etc. is designated by using input means such as a mouse or a keyboard, etc. and the designated area of interest can be determined as the ROI. More than one ROI can be designated. As another way of designating the ROI, it is possible to designate some of the regions divided using the tiles, the precincts, or the code blocks as the ROI. In such a case, for example, numbers may be allocated to each region divided from the image displayed on the display screen, etc., and the ROI can be designated by inputting relevant numbers corresponding to the ROI by the mouse or the keyboard, etc. Again, in this case, more than one ROI can be designated.

The quantized wavelet coefficients are divided into layers, which are collections of bit planes, in the bit plane division unit 120d. The division into layers is determined by the bit plane division control unit 122 according to the bit plane division determined with respect to each region in the bit plane division designating unit 123. More specifically, a level of interest is given to the ROI designated in the region designation unit 124. The term "level of interest" used here indicates a measure for controlling the compression for the ROI in the image. For example, for regions desired to be high definition, more bits are allocated to the layer with higher priority. The level of interest can be appropriately determined according to the users' desires with respect to each ROI. By determining different bit plane divisions according to the level of interest determined by the user, it is possible to control the compression while maintaining image quality precision.

As an embodiment that is often used, it is possible to determine two types of bit plane divisions for the divided regions. In such a case, different bit plane divisions may be determined for the ROI and the regions other than the ROI. In other words, when more bit planes (bit numbers) of the ROI are allocated to a layer with higher priority, the image quality of the ROI will be high definition. When fewer bit planes (bit numbers) of the ROI are allocated to the layer with higher priority, the image quality of the ROI will be coarse. Consequently, it is possible to appropriately determine the bit plane division according to the users' tastes.

The bit plane division control unit 122 controls the compression by controlling the number of bits to be included in a layer with respect to each region based on the determined bit plane division. The compression-controlled regions are provided to the entropy coding/decoding unit 120e so as to be entropy coded. Then the code stream processing is performed in the tag processing unit 120f.

According to the present invention, since at least two types of bit plane divisions are employed for the regions divided from the original image, it is possible to readily realize compression control that reflects the users' tastes. Further, by using the tiles, the precincts, and the code blocks, which will be standard specifications for the JPEG 2000 algorithm, for dividing the image into a plurality of regions, it is possible to readily realize compression control. Further, when dividing the original image into a plurality of regions, the image may be divided according to the regions determined by the user, therefore it is possible to perform effective image compression control.

The image compression/decompression device shown in FIG. 18 can be applied to motion images by employing the same configuration as that of the motion image compression/decompression device 30 shown in FIG. 10. In such a case, the bit plane division with respect to each region can be determined for all images, can be determined when there is a change, or can be determined by automatically detecting the displacement of the target from the difference data between the frames, etc.

Figure 19:
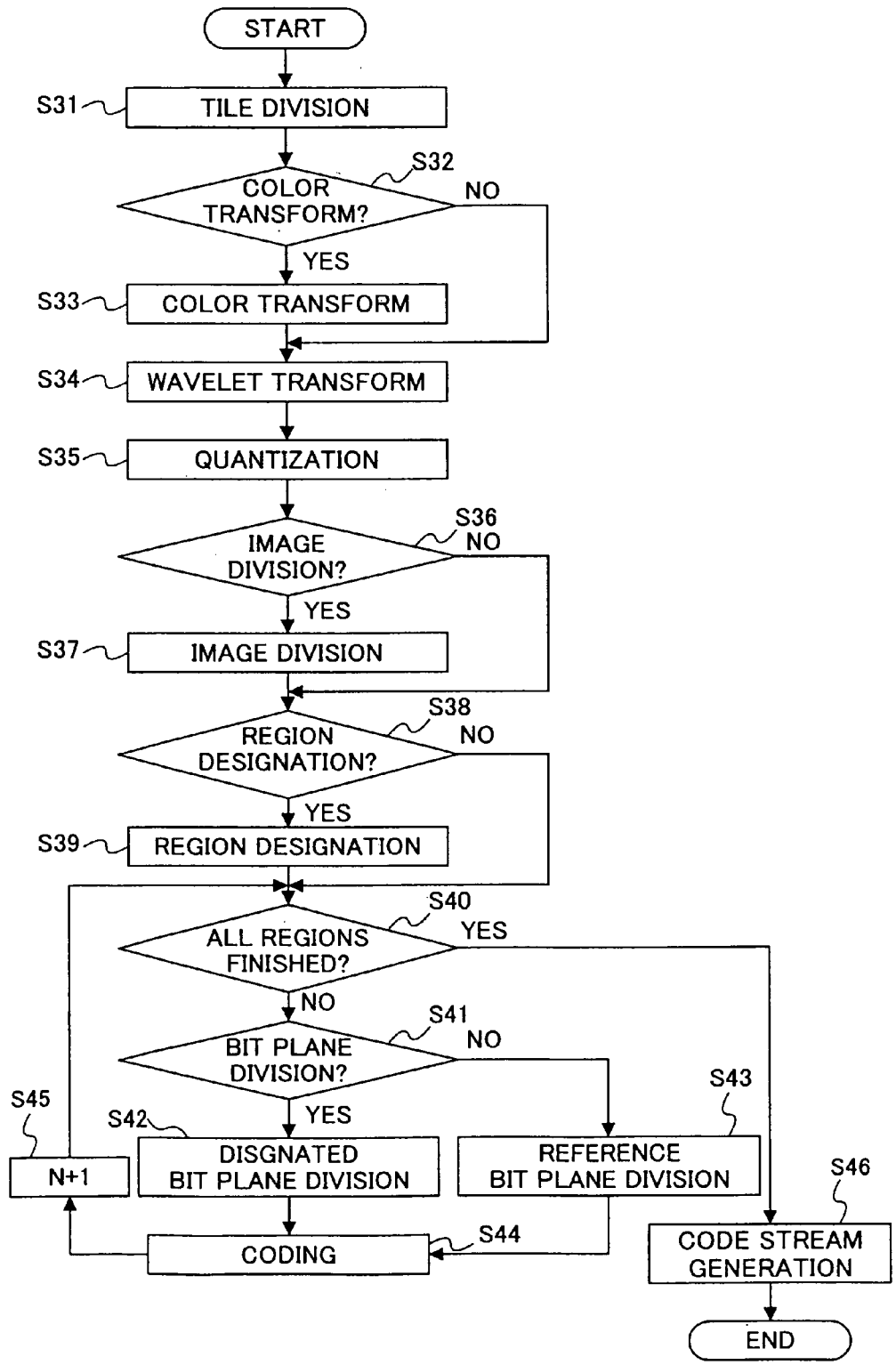
FIG. 19 shows a flow chart illustrating an example of another image compression method according to one embodiment of the present invention.

FIG. 19 shows a flow chart illustrating an example of another image compression method according to one embodiment of the present invention. In the present example, the description will be given to the case when the original image is divided into a plurality of regions by using the precincts; however, the same processing can be applied to the cases where the image division is performed by using the tiles or the code blocks. First, when the image compression/decompression device according to one embodiment of the present invention receives an input image, the image is divided into a plurality of tiles (step S31). It is determined whether color space transformation into RGB or YUV, etc. is to be performed or not according to the color space of the input image (step S32). When it is determined that the color space transformation is necessary (YES), the color space transformation is performed (step S33). When it is determined that the color space transformation is not necessary (NO), for example, when the input image is already color space transformed or when the input image is to be compressed without performing the color space transformation, step S33 is skipped. Next, the wavelet transformation is applied to the color transformed input image (step S34), and after the wavelet transformation, the quantization is performed (step S35). Next, it is determined whether the image is further divided into a plurality of further regions or not (step S36). As for determination of image division, for example, the division may be automatically performed according to the size of the image or a user may provide a command to perform the division, etc. When it is determined that the image division is necessary (YES), the image division is performed (step S37). In the present example, the image division is performed by using the precincts. When it is determined that the image division is not necessary (NO), or the division unit is the tile, step S37 is skipped.

Next, it is determined whether the designating the ROI in the image is to be performed or not (step S38). When it is determined that the designating of the ROI is to be performed (YES), the ROI in the image is designated (step S39). More precisely, the range of an area of interest in the image displayed on the display screen, etc., is designated using the input device such as a mouse or a keyboard, etc., and the ROI can be designated according to the designated area of interest. More than one ROI can be designated. As another way of designating the ROI, it is possible to designate the ROI from the regions divided using the tiles, the precincts, or the code blocks. In such a case, for example, numbers may be allocated to each region divided from the image displayed on the display screen, etc. and the ROI can be designated by inputting relevant numbers corresponding to the ROI by the mouse or the keyboard. When it is determined that the designating of the ROI is not to be performed, step S39 is skipped.

Next, it is determined whether processing is finished for all regions (step S40). When it is determined that the processing is not finished for all regions (NO), it is determined whether the bit plane division is determined with respect to each divided region (step S41). When it is determined that the change of the bit plane division is necessary and the bit plane division is determined with respect to each region by the user (YES), the bit plane division is determined for the relevant divided regions (step S42). When the bit plane division is not determined by the user (NO), the reference bit plane division is determined with respect to each region (step S43).

Next, coding is performed (step S44). When the coding is finished, a counter for counting the number of divided regions is incremented (step S45) and the process returns to step S40. The process from step S40 through step S45 is repeatedly performed until all divided regions are processed. When the process is finished with respect to all divided regions (step S40, YES), the code stream processing is performed (step S46) and the process ends.

The following is a description for the case when the present invention is applied to the still grayscale image and when multiple bit planes are allocated to a lower numbered layer (higher priority) when the regions including the human face shown in FIG. 12A are determined as the ROI. In this example, the division unit for dividing the original image is the tile. As shown in FIG. 12A, the original image 40 is divided into a plurality of tiles and as shown in FIG. 4, and each tile is provided with a number according to the raster order from 0 to 15. The tiles having the numbers 5, 6, 9, and 10 corresponding to the black portion 41 shown in FIG. 12B are the ROI.

FIG. 20 shows an example of bit plane division with respect to each tile. As shown in FIG. 20, by including more bit planes of the ROI into the lower numbered layers (higher priority), it is possible to realize high compression of the original image 40 while maintaining the image precision of the regions including the human face.

Further, the following is a description of another embodiment when the present invention is applied to the still grayscale images with reference to FIG. 13A and FIG. 13B. In this embodiment, a description is given for the image region dividing when the user designates the portions of human face shown in FIG. 13A as the ROI and desires to differentiate the bit plane division of the ROI with respect to regions other than the ROI. In the present embodiment, the division unit for dividing the original image is the tile. By determining the tile size so as to cover the human face shown of the original image 40, it is possible to effectively control the compression. In the present embodiment, by including more bit planes of the tile having the number 10 corresponding to the black portion 42 shown in FIG. 13B into the lower numbered layers (higher priority), it is possible to perform high compression of the original image 40. Obviously, it is possible to use a plurality of tiles instead of one tile in order to cover the human face portion.

The following is a description for the case when one embodiment of the present invention is applied to the still grayscale image with reference to FIG. 14A and FIG. 14B. Similar to the example of the tile shown in FIG. 12A and FIG. 12B, multiple bit planes are including into the lower numbered layers (higher priority) when the regions including the human face shown in FIG. 14A are determined as the ROI. In this example, the division unit for dividing the original image is the precinct. As shown in FIG. 14A, the original image 40 is divided into a plurality of precincts. By including more bit planes of the precincts corresponding to the black portion 43 shown in FIG. 14B into the lower numbered layers (higher priority), it is possible to realize high compression of the original image 40 while maintaining the image precision of the regions including the human face.

The following is a description for the case when one embodiment of the present invention is applied to the still grayscale image with reference to FIG. 15A and FIG. 15B. Similar to the example of the tile shown in FIG. 12A and FIG. 12B, multiple bit planes are included into the lower numbered layers (higher priority) when the regions including the human face shown in FIG. 15A are determined as the ROI. In this example, the division unit for dividing the image is the code block. As shown in FIG. 15A, the original image 40 is divided into a plurality of code blocks. By including more bit planes of the code blocks corresponding to the black portion 44 shown in FIG. 15B into the lower numbered layers (higher priority), it is possible to realize high compression of the original image 40 while maintaining the image precision of the regions including the human face.

Figure 21:
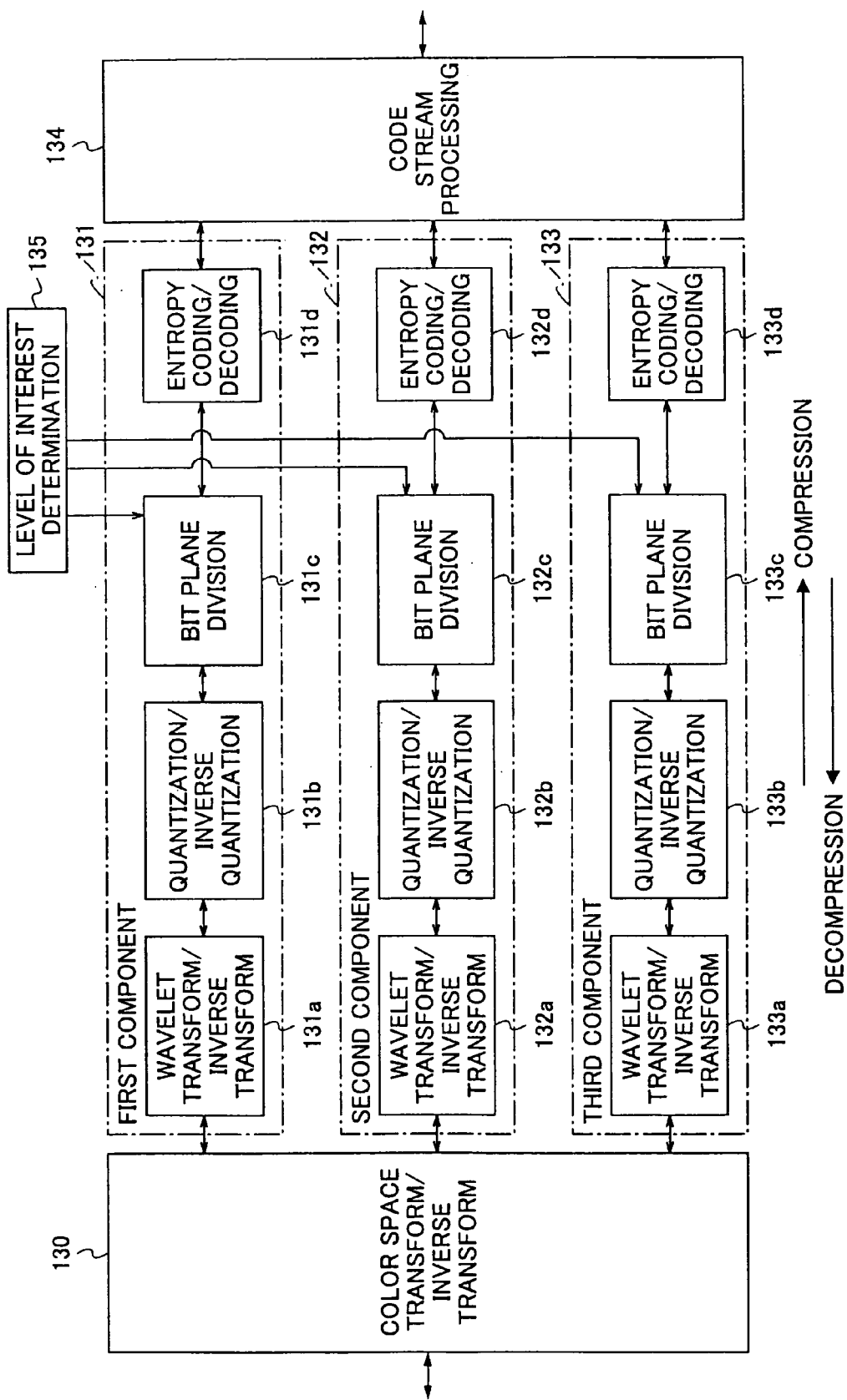
FIG. 21 shows a block diagram illustrating another configuration example of an image compression/decompression device for still images according to one embodiment of the present invention.

FIG. 21 shows a block diagram illustrating another configuration example of the image compression/decompression device for still images according to one embodiment of the present invention. The image compression/decompression device includes a color space transformation/inverse-transformation unit 130, a first component 131, a second component 132, a third component 133, a code stream processing unit 134, and a level of interest determination unit 135. The first component 131 is configured from a wavelet transformation/inverse transformation unit 131a, a quantization/inverse quantization unit 131b, a bit plane division unit 131c, and an entropy coding/decoding unit 131d. The second component 132 is configured from a wavelet transformation/inverse transformation unit 132a, a quantization/inverse quantization unit 132b, a bit plane division unit 132c, and an entropy coding/decoding unit 132d. The third component 133 is configured from a wavelet transformation/inverse transformation unit 133a, a quantization/inverse quantization unit 133b, a bit plane division unit 133c, and an entropy coding/decoding unit 133d. The level of interest determination unit 135 determines the level of interest for the bit planes, which are decomposed from the wavelet coefficients, of the divided regions such as tiles, etc.

It is noted that in the image compression/decompression device shown in FIG. 21, although the transformation and the inverse transformation of respective processing are represented as a single block so as to accomodate both compression and decompression, it is possible to allocate different blocks for the transformation and the inverse transformation, respectively. By doing so, it is possible to make use of an independent image compression device and an independent image decompression device. Also, the compressed images to be decompressed by the image compression/decompression device or the image decompression device according to the present invention are not limited to the images compressed by the image compression device according to the present invention, but also include any compression images in general that have been compressed by controlling the compression with respect to each region divided from an original image based on the level of interest, which is determined with respect each bit plane for the respective divided regions.

The above mentioned image compression/decompression device is for still images. Each process in the first component 131, the second component 132, and the third component 133 are performed in parallel. The color space used in this embodiment is either RGB or YUV.

The following is a description of compression. First, the original image is transformed into RGB or YUV color space in the color space transformation/inverse transformation unit 130. The following processing is carried out in parallel in the first component 131, the second component 132, and the third component 133. Here, a description is given for the processing in the first component 131. However, the same processing is performed in the second component 132 and the third component 133. The image having color space transformed is divided into a plurality of tile regions. The wavelet transformation/inverse transformation unit 131a performs the wavelet transformation with respect to each tile region. Next, in the quantization/inverse-quantization unit 131b, the wavelet transformed coefficients are quantized.

In the bit plane division unit 131c, bit planes configured from the quantized wavelet coefficients are divided with respect to each tile region. When the user determines the level of interest of the bit planes in the respective regions, the bit plane division unit 131c determines the bit plane division according to the determined level of interest. Accordingly, the bit planes are divided according to the level of interest with respect to each region of the image. Then, the wavelet coefficients are entropy coded in the entropy coding/ decoding unit 131d. Lastly, the code streams are generated in the code stream processing unit 134. When generating code streams, code sequence is generated according to the level of interest and the code streams are configured according to the order of the level of interest, as later shown in FIG. 25.

Figure 22:
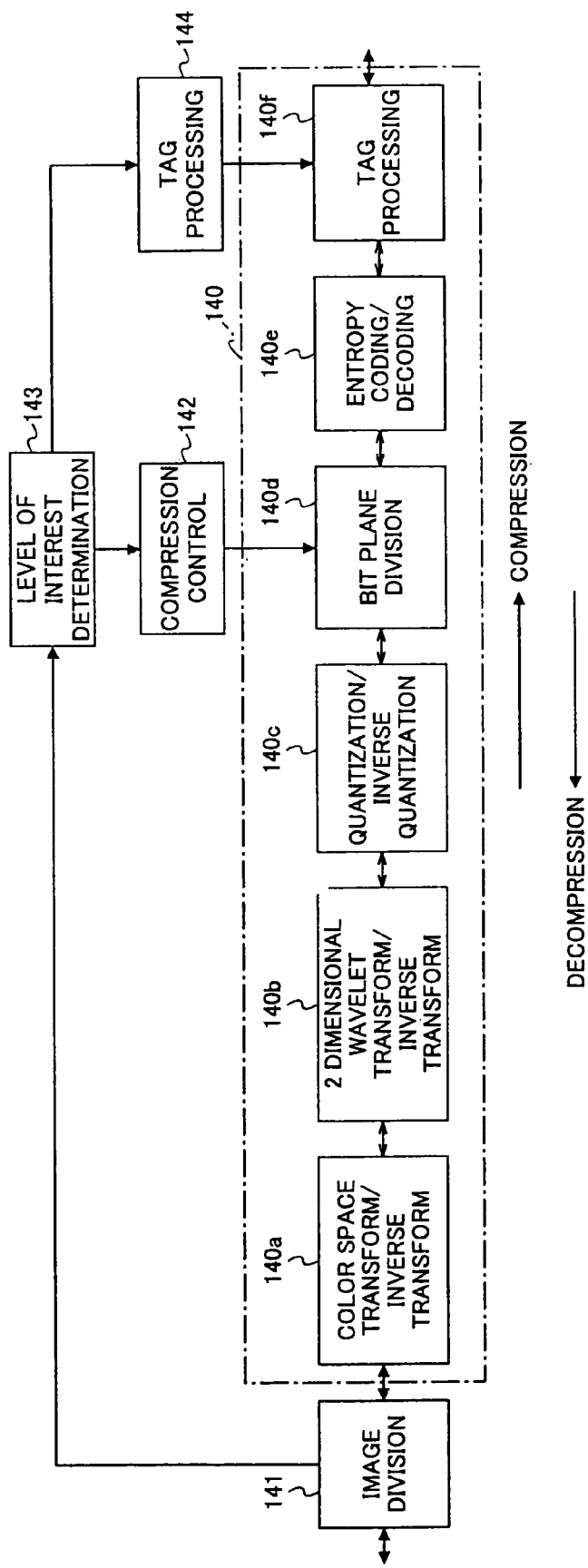
FIG. 22 shows a block diagram illustrating the details of another configuration example of an image compression/decompression device according to one embodiment of the present invention.

FIG. 22 shows a block diagram illustrating the details of another configuration example of the image compression/ decompression device according to one embodiment of the present invention. In FIG. 22, the image compression/ decompression device 140 includes a color space transformation/inverse transformation unit 140a, a two-dimensional wavelet transformation/inverse transformation unit 140b, a quantization/inverse quantization unit 140c, a bit plane division unit 140d, an entropy coding/decoding unit 140e, and a tag processing unit 140f. In FIG. 22, there are also provided image division unit 141, compression control unit 142, level of interest determination unit 143, and tag processing control unit 144. The compression/decompression device 140 performs the similar processing as that of each component shown in FIG. 21. The tag processing unit 140f is added to the device as a characteristic of the JPEG 2000 algorithm, and it generates and interprets code streams.

The original image is divided into a plurality of regions by the image division unit 141 after being color space transformed in the color space transformation/inverse transformation unit 140a, being two-dimensional wavelet transformed in the two-dimensional wavelet transformation/ inverse transformation unit 140b, and being quantized in the quantization/inverse quantization unit 140c. The divided regions are called tiles. The quantized wavelet coefficients are divided into layers, which are collections of bit planes, by the bit plane division unit 140d. The division into layers is determined by the compression control unit 142 according to the level of interest designated by the level of interest determination unit 143. The compression controlled bit planes are entropy coded in the entropy coding/decoding unit 140e and the code stream process is performed in the tag processing unit 140f. When performing the code stream process, it is determined in the tag processing control unit 144 that the code stream sequence corresponding to the level of interest is generated.

As an embodiment that is often used, it is possible to determine two types of bit plane divisions for the divided regions. In such a case, the level of interest may be determined so that the bit plane divisions for any target region and the region other than the target region differ. In other words, when a higher level of interest is determined for the bit planes of the target region than for the bit plane of regions other than the target region, the image quality of the target region is high definition. When a lower level of interest is determined for the bit planes of the target region than for the bit plane of regions other than the target region, the image quality of the target region is coarse. Consequently, it is possible to appropriately determine the bit plane division according to the users' desires.

According to one embodiment of the present invention, since it is possible to control the compression according to the level of interest determined for bit planes with respect to the whole image, it is possible to realize the image compression according to the users' desires. In addition, since the level of interest is determined with respect to at least two types of regions, it is possible to readily realize the compression control, which reflects the users' tastes, by a simple configuration.

The image compression/decompression device shown in FIG. 22 can be applied to motion images by employing the configuration similar to the motion image compression/ decompression device 30 shown in FIG. 10. In such a case, the bit plane division with respect to each region can be determined for all images, can be determined when there is a change, or can be determined automatically by detecting the displacement of the target from the difference data between the frames, etc.

Figure 23:
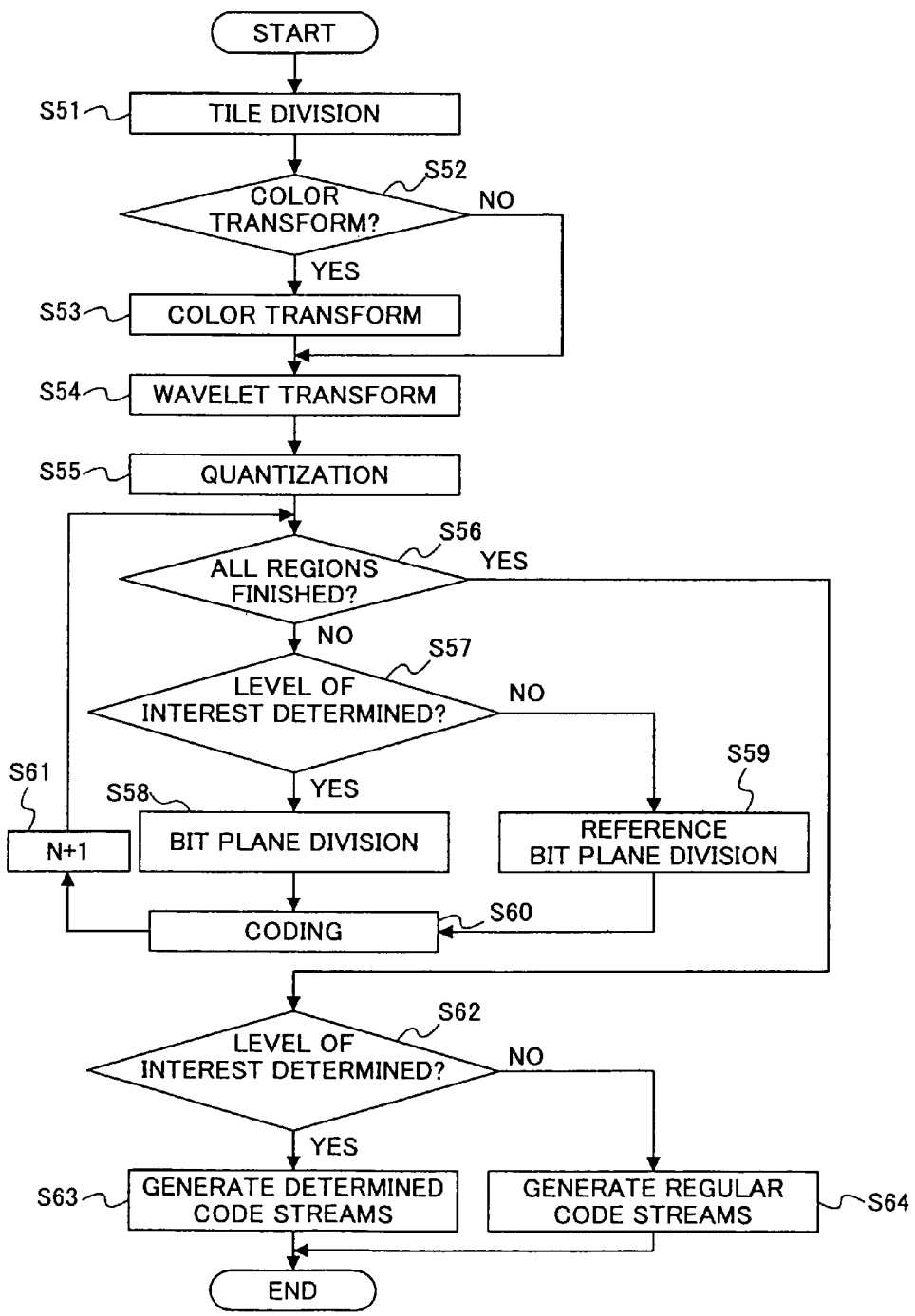
FIG. 23 shows a flow chart illustrating an example of another image processing method according to one embodiment of the present invention.

FIG. 23 shows a flow chart illustrating an example of another image compression method according to one embodiment of the present invention. First, when the image compression/decompression device receives an input image, the image is divided into a plurality of tiles (step S51). It is determined whether color space transformation into RGB or YUV, etc., is to be performed or not according to the color space of the input image (step S52). When it is determined that the color space transformation is necessary (YES), the color space transformation is performed (step S53). When it is determined the that color space transformation is not necessary (NO), for example, when the input image is already color space transformed or when the input image is to be compressed without performing the color space transformation, step S53 is skipped. Next, the wavelet transformation is applied to the color transformed input image (step S54), and after the wavelet transformation, the quantization is performed (step S55).

Next, it is determined whether processing is finished with respect to all regions (step S56) and when it is determined that the processing is not finished with respect to all regions (NO), it is determined whether a level of interest is determined with respect to each divided region (step S57). When the level of interest is determined with respect to each bit plane in the region by the user and the division is designated (YES), the bit plane division is determined for the relevant divided regions (step S58). When the bit plane division is not designated (NO), the reference bit plane division is determined with respect to each region (step S59).

Next, the coding of the divided bit plane is performed (step S60). When the coding is finished, a counter for counting the number of divided regions is incremented (step S61) and the process returns to step S56. The process from step S56 through step S61 is repeatedly performed until all divided regions are processed. When the process is finished with respect to all divided regions (step S56, YES), it is determined again whether the level of interest is determined or not (step S62). When the level of interest is determined, the code stream sequence is generated according to the determined level of interest (step S63) and the tag processing is performed. When the level of interest is not determined, the regular code stream sequence is generated (step S64) and the process ends.

The following is a description of the case when the present embodiment is applied to the still grayscale image with reference to FIG. 12A and FIG. 12B. Here, the division unit for dividing the image is the tile. As shown in FIG. 12A, the original image 40 is divided into a plurality of tiles and as shown in FIG. 4, and each tile is provided with a number according to the raster order from 0 to 15. The tiles having the numbers 5, 6, 9, and 10 corresponding to the black portion 41 shown in FIG. 12B are considered as the target that is given priority.

Figure 25:
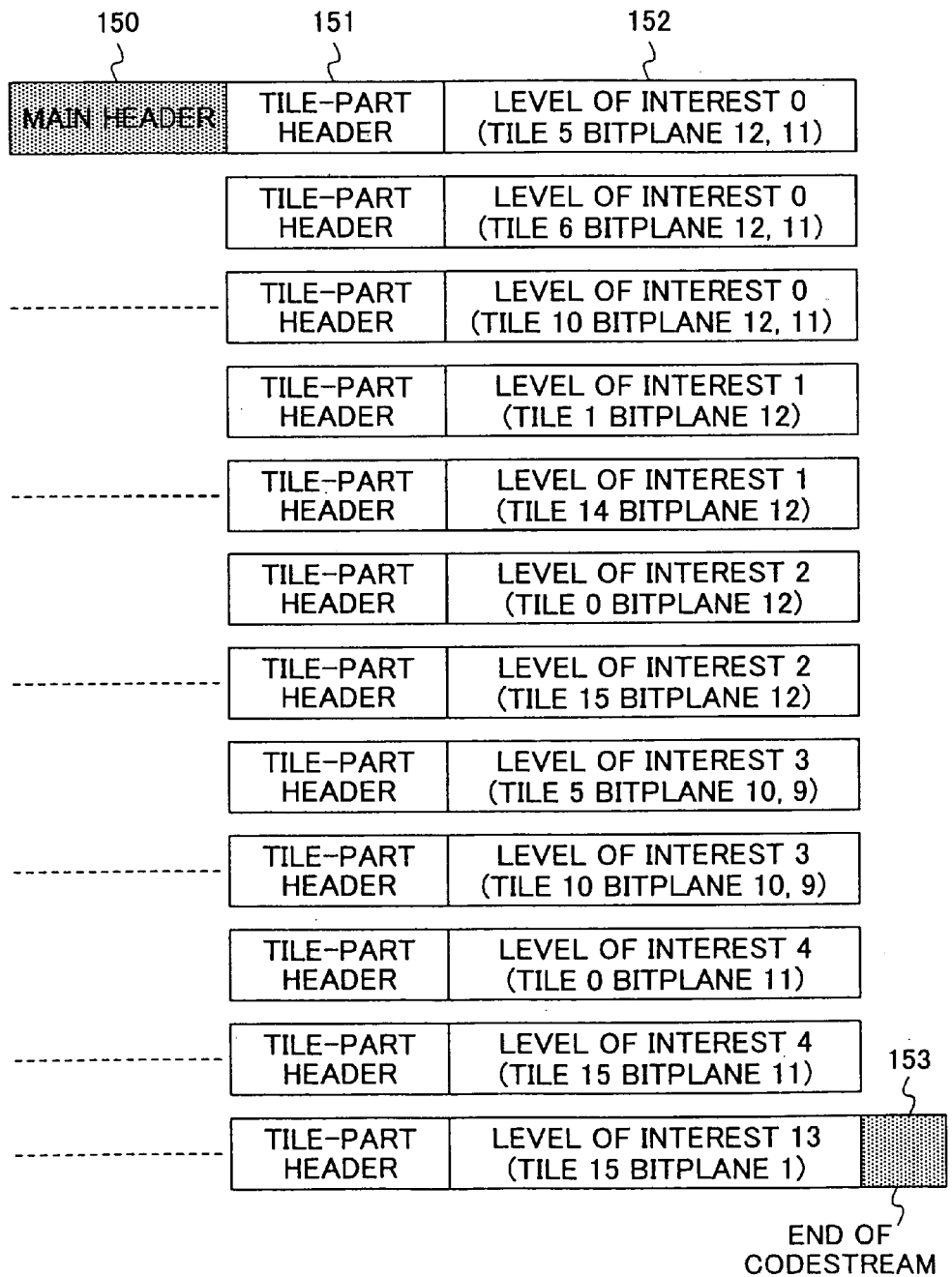
FIG. 25 shows a configuration example of a code sequence when the level of interest with respect to each tile is determined as shown in FIG. 24.

FIG. 24 shows an example of level of interest determination with respect to each tile according to one embodiment of the present invention. More specifically, FIG. 24 shows the determination examples of the levels of interest for tiles having the numbers 5, 6, 9, and 10 as the tiles given priority and for tiles other than the tiles given priority. As shown, a higher level of interest is given to a larger number of bit planes of the tiles given priority (in this example, "0" is the highest level of interest). When generating a code sequence as shown in FIG. 25, it is possible to create a code sequence according to the level of interest. In addition, in case there is a limit to the size of the code sequence, it is possible to improve the compression rate by deleting bit planes with a lower level of interest.

FIG. 25 shows a configuration example of the code sequence when the level of interest with respect to each tile is determined as shown in FIG. 24. In FIG. 25, the code sequence includes a main header 150, a plurality of tile unit headers 151, a plurality of bit streams 152, and an end of code stream 153. By configuring the code sequence using the data with a higher level of interest first, even in the case when the transmission is interrupted, it is possible to obtain an effective image. For example, it is possible to readily respond to the requirement that the data only up to the second level of interest (level of interest 2) is necessary. Further, when predetermined functions are provided to the decompression devices, it is possible to sequentially display the data the order in which it arrived. Accordingly, it is possible to sequentially display the data with a higher level of interest first.

Figure 26:
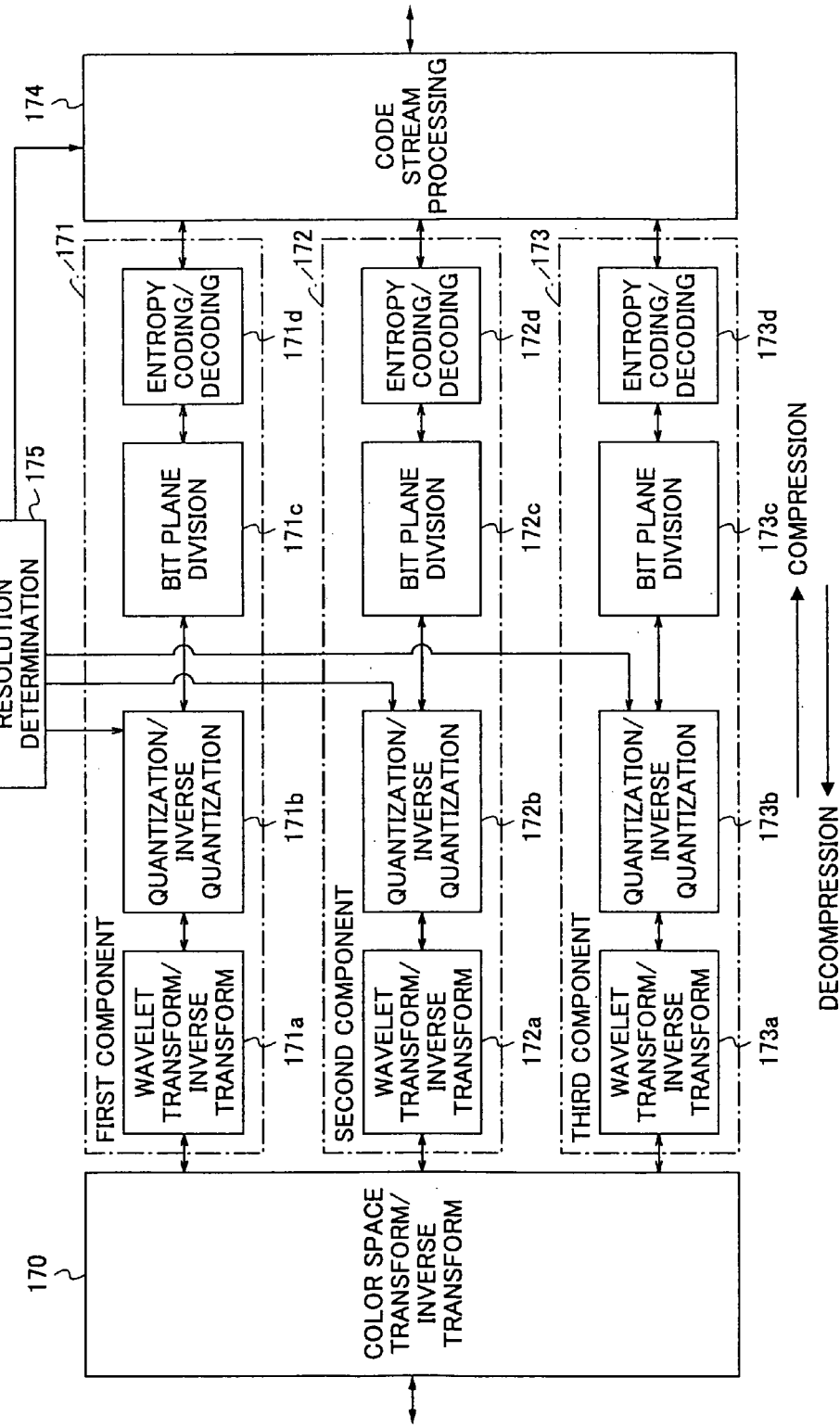
FIG. 26 shows a block diagram illustrating another configuration example of an image compression/decompression device for still images according to one embodiment of the present invention.

FIG. 26 shows a block diagram illustrating another configuration example of an image compression/decompression device for still images according to one embodiment of the present invention. As shown in FIG. 26, the image compression/decompression device according to the present embodiment of the present invention includes a color space transformation/inverse transformation unit 170, a first component 171, a second component 172, a third component 173, a code stream processing unit 174, and a resolution determination unit 175. The first component 171 is configured from a wavelet transformation/inverse transformation unit 171a, a quantization/inverse quantization unit 171b, a bit plane division unit 171c, and an entropy coding/decoding unit 171d. The second component 172 is configured from a wavelet transformation/inverse transformation unit 172a, a quantization/inverse quantization unit 172b, a bit plane division unit 172c, and an entropy coding/decoding unit 172d. The third component 13 is configured from a wavelet transformation/inverse transformation unit 173a, a quantization/inverse quantization unit 173b, a bit plane division unit 173c, and an entropy coding/decoding unit 173d.

It is noted that in the image compression/decompression device shown in FIG. 26, although the transformation and the inverse transformation of respective processing are represented as a single block to accomodate both compression and decompression, it is possible to allocate different blocks for the transformation and the inverse transformation, respectively. By doing so, it is possible to make use of an independent image compression device and an independent image decompression device. Also, the compressed images to be decompressed by the image compression/decompression device or the image decompression device according to one embodiment of the present invention are not limited to the images compressed by the image compression device according to one embodiment of the present invention, but also include any compression images in general that have been compressed by controlling the compression with respect to each region divided from an original image based on resolution, which is determined with respect to the divided regions.

The above described image compression/decompression device shown in FIG. 26 is for still images. Each process in the first component 171, the second component 172, and the third component 173 are performed in parallel. The color space used in this embodiment is either RGB or YUV.

The following is a description of compression. First, the original image is transformed into RGB or YUV color space in the color space transformation/inverse transformation unit 170. The following processing is carried out in parallel in the first component 171, the second component 172, and the third component 173. Here, a description is given for the processing in the first component 171. However, the same processing is performed in the second component 172 and the third component 173. The image having color space transformed is divided into a plurality of tile regions. The wavelet transformation/inverse transformation unit 171a performs the wavelet transformation with respect to each tile region.

Next, the wavelet transformed coefficients are quantized in the quantization/inverse quantization unit 171b. When the resolution is determined with respect to each divided region, the quantization is performed according to the determined resolution. More specifically, the high frequency component of the wavelet coefficients is set to 0 or cut according to the determined resolution. That is to say, a predetermined threshold is determined for the wavelet coefficient values (high frequency component) and this threshold and the resolution are associated. When the user determines the resolution, the wavelet coefficients below the thresholds corresponding to the resolution are cut (code is omitted), or the wavelet coefficient values below the threshold are set to 0. As another way, the resolution determined by the user may be associated with the high frequency components of the sub-band (HL, LH, and HH), and the wavelet coefficients of high frequency components according to the resolution may be cut (code is omitted) or all wavelet coefficient values of high frequency components may be set to 0.

Next, in the bit plane division unit 171c, the bit planes configured from the quantized wavelet coefficients are divided with respect to each region and the divided wavelet coefficients are entropy coded in the entropy coding/decoding unit 171d. Lastly, the code streams are generated in the code stream processing unit 174.

Figure 27:
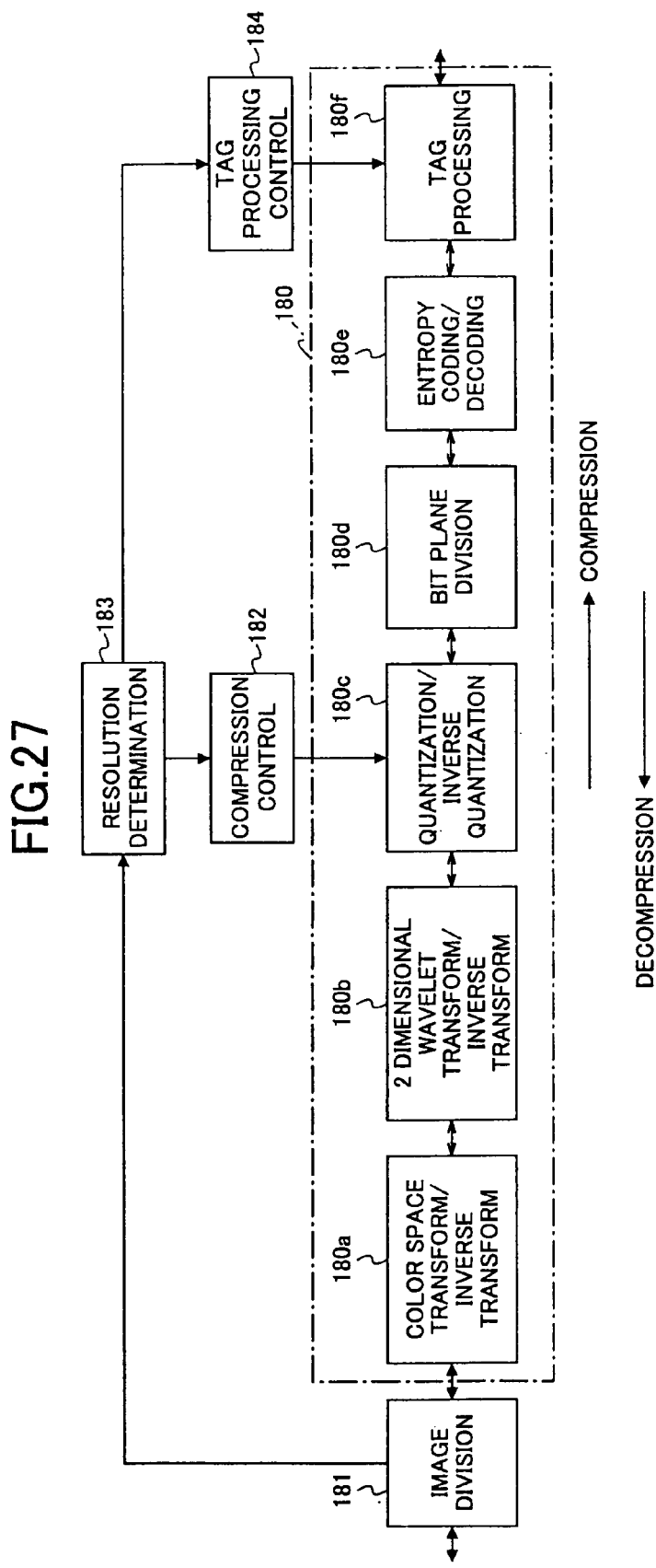
FIG. 27 shows a block diagram illustrating the details of another configuration example device according to one embodiment of the present invention.

FIG. 27 shows a block diagram illustrating the detail of the configuration example of the compression/decompression device according to one embodiment of the present invention. In FIG. 27, the image compression/decompression device 180 includes a color space transformation/inverse transformation unit 180a, a two-dimensional wavelet transformation/inverse transformation unit 180b, a quantization/inverse quantization unit 180c, a bit plane division unit 180d, an entropy coding/decoding unit 180e, and a tag processing unit 180f. In FIG. 26, there are also provided image division unit 181, compression control unit 182, resolution determination unit 183, and tag processing unit 184. The compression/decompression device 180 performs processing similar to that of each component shown in FIG. 25. The tag processing unit 180f is added to the device as a characteristic of the JPEG 2000 algorithm, and generates and interprets code streams.

The original image is divided into a plurality of regions by the image division unit 181 after being color space transformed in the color space transformation/inverse transformation unit 180a, being two-dimensional wavelet transformed in the two-dimensional wavelet transformation/ inverse transformation unit 180b, and being quantized in the quantization/inverse quantization unit 180c. The divided regions are called tiles. The quantization is performed according to the resolution determined by the resolution determination unit 183. It is noted that according to the present embodiment, the description is given for the case when the separation of regions of interest and the regions other than the region of interest is performed with the division unit of tiles. However, other division units such as precincts, code blocks, or positions (pixels) in the image, or the combination of the three are also possible.

The quantized wavelet coefficients are divided into layers, which are collections of bit planes, in the bit plane division unit 180*d*. The bit planes being compression controlled in the compression control unit 182 according to the resolution determined by the resolution determination unit 183 are entropy coded in the entropy coding/decoding unit 180*e*. After which, the code streaming process is performed in the tag processing unit 180*f*. The code stream sequence is generated according to the determined resolution by the tag processing control unit 184.

As an embodiment that is often used, it is possible to determine two types of resolutions for the divided regions. In such a case, the resolution may be determined so that the resolution for any target region differs from the resolution for regions other than the target region. In other words, when the resolution of the target region is determined higher than that of the regions other than the target region, the image quality of the target region is high definition. When the resolution of the target region is determined lower than that of the regions other than the target region, the image quality of the target region is coarse. Accordingly, it is possible to appropriately determine resolutions according to users' desires.

Further, in the present embodiment, according to the resolution determined in the resolution determination unit 183, it is possible to appropriately omit the computation of the wavelet coefficients. For example, the computation for high frequency components (LH, HL, and HH) among the wavelet coefficients may be omitted. Therefore, it is possible to speed up the processing by omitting unnecessary computation. Further, it is effective to use average computation or to use particular elements extracted from the low frequency components, etc., for the computation of the low frequency components of the wavelet coefficients in a certain region in order to speed up the processing.

According to one embodiment of the present invention, since compression control is performed according to the resolution determined with respect to each region divided from the original image, it is possible to finely control the image quality with respect to each region. In addition, since it is possible to determine resolution with respect to at least two regions, it is possible to realize compression control, which reflects the users' tastes, by a simple configuration. Further, by appropriately omitting computation of the wavelet coefficients, it is possible to omit unnecessary processing. Therefore, it is possible to speed up the processing.

The image compression/decompression device shown in FIG. 27 can be applied to motion images by employing the configuration similar to the motion image compression/decompression device 30 shown in FIG. 10. In such a case, the determination of the bit plane division with respect to each region can be performed for all images, can be performed when there is a change, or can be performed by automatically detecting the displacement of the target from the difference data between the frames, etc.

Figure 28:
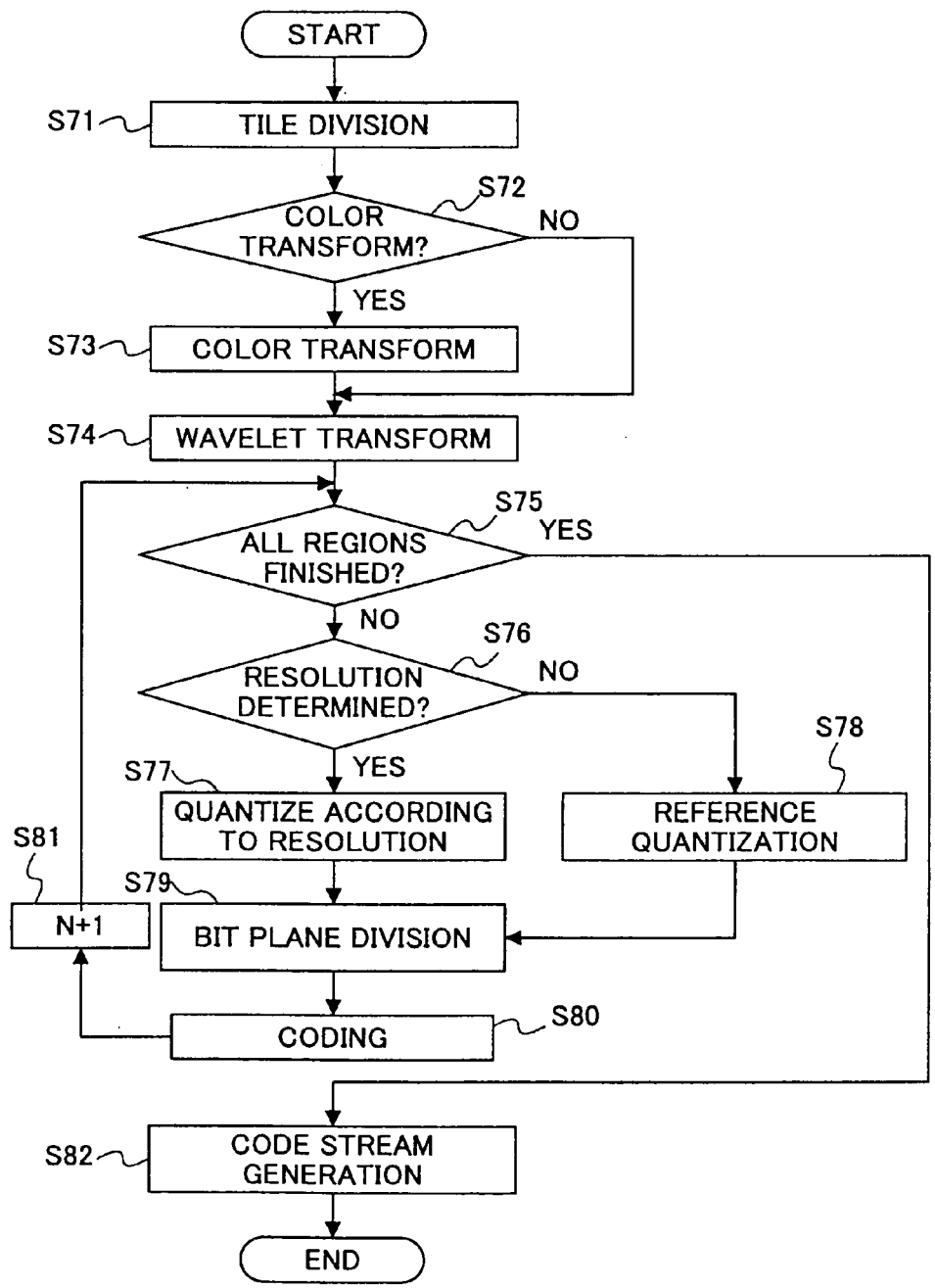
FIG. 28 shows a flow chart illustrating an example of another image compression method according to one embodiment of the present invention.

FIG. 28 shows a flow chart illustrating an example of another image compression processing according to one embodiment of the present invention. First, when the image compression/decompression device according to the present invention receives an input image, the image is divided into a plurality of tiles (step S71). It is determined whether color space transformation into RGB or YUV, etc. is to be performed or not according to the color space of the input image (step S72). When it is determined that the color space transformation is necessary (YES), the color space transformation is performed (step S73). When it is determined the that color space transformation is not necessary (NO), for example, when the input image is already color space transformed or when the input image is to be compressed without performing the color space transformation, step S73 is skipped. Next, the wavelet transformation is applied to the color transformed input image (step S74).

Next, it is determined whether the processing is finished with respect to all regions (step S75). When it is determined that the processing is not finished with respect to all regions (NO), it is determined whether resolution is determined with respect to each region (step S76). When it is determined that the resolution is determined (YES), the quantization is performed according to the resolution with respect to the relevant regions (step S77). When it is determined that the resolution is not determined (NO), the quantization is performed by determining the standard resolution with respect to each region (step S78).

Next, the bit plane division is performed with respect to the relevant regions (step S79) and after that the coding is performed (step S80). When the coding is finished, a counter counting the number of the divided regions is incremented (step S81) and the process returns to step S75. The process in step S75 through step S80 is repeatedly performed until all regions are processed. When all regions are processed (step S75, YES), the code stream sequence is generated (step S82) and the process ends.

The following is a description of the case when the present embodiment is applied to the still grayscale image with reference to FIG. 12A and FIG. 12B. Here, the division unit for dividing the image is the tile and the resolution is determined with respect to each divided region. As shown in FIG. 12A, the original image 40 is divided into a plurality of tiles and as shown in FIG. 4, each tile is provided with a number according to the raster order from 0 to 15. The tiles having the numbers 5, 6, 9, and 10 corresponding to the black portion 41 shown in FIG. 12B are considered as the target with priority (region of interest). When the resolution of the region of interest 41 is the same as that of the original image 40 and the resolution of regions other than the region of interest 41 is one fourth (¼) of the region of interest, components other than the LL component of the wavelet coefficients are all set to 0 or changed into the state with no code.

According to one embodiment of the present invention, resolution can be finely determined for the region of interest and regions other than the region of interest. By being able to perform compression according to the determined resolution, it is possible to realize high compression while maintaining high image quality and also it is possible to realize the reduction of processing time needed for the compression.

So far, the descriptions are given for each embodiment of the image compression device, the image decompression device, the image compression method, and the image decompression method. It is possible to conceive embodiments of the present invention as a program for making a computer work as such devices or for making the computer function as each means of such devices, a program for making the computer execute such methods, and a computer-readable recording medium storing such a program.

A description is given for the embodiments of a recording medium storing programs or data for realizing image compression/decompression functions according to the present invention. As for the recording medium, more specifically, a CD-ROM, an optical magnetic disk, a DVD-ROM, a flexible disk, a flash memory, a memory card, a memory stick, or various other ROMs or RAMs, etc., can be conceived. By distributing the recording medium storing programs for realizing the image compression/decompression function by making a computer execute functions related to each embodiment of the present invention mentioned above, it is possible to facilitate the realization of the relevant functions. Further, by making an information handing devices such as a computer provided with such a recording medium read out such a program stored thereon or by reading out the program according to need by storing the program on a storing medium provided in the information handling device, it is possible to execute the image compression/decompression function according to the embodiments of the present invention.

According to one embodiment of the present invention, it is possible to implement a program having the function of an image compression device or an image decompression device and by executing such a program, it is possible to realize the image compression/decompression processing according to users' tastes.

Further, the present invention is not limited to these embodiments, and variations and modifications may be made without departing from the scope of the present invention.

The present application is based on Japanese priority application No. 2002-071470 filed on Mar. 15, 2002 and No. 2002-171872 filed on Jun. 12, 2002 the entire contents of which are hereby incorporated by reference.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. An image compression device, comprising:
    a division unit to divide an image into a plurality of regions;
    a wavelet transform unit to apply a wavelet transform on the plurality of regions;
    a region designation unit to designate a region of interest for a part of the image that is of interest;
    a level of interest setting unit to set a level of interest for each region of interest;
    a quantization rate setting unit to set a quantization rate for each wavelet transformed region, according to the level of interest, wherein when the quantization rate of the region of interest is set higher than quantization rates of the other regions, the image quality of the region of interest becomes coarser, while, when the quantization rate of the region of interest is set lower than quantization rates of the other regions, the image quality of the region of interest becomes finer;
    a compression control unit to control compression for each region based on the quantization rate;
    a quantization unit to perform quantization based on the quantization rate on the compression controlled region; and
    an entropy encoding unit to perform entropy encoding on quantized data generated by the quantization unit.

2. The image compression device as claimed in claim 1, wherein:
    at least one of the plurality of regions comprises a tile, and the tile is set to have a tile size such that the tile covers a human face in the image.

3. An image compression method, comprising:
    dividing an image into a plurality of regions;
    applying a wavelet transform to the plurality of regions;
    designating a region of interest for a part of the image that is of interest;
    setting a level of interest for each region of interest;
    setting a quantization rate for each wavelet transformed region, according to the level of interest, wherein when the quantization rate of the region of interest is set higher than quantization rates of the other regions, the image quality of the region of interest becomes coarser, while, when the quantization rate of the region of interest is set lower than quantization rates of the other regions, the image quality of the region of interest becomes finer;
    controlling compression for each region based on the quantization rate;
    performing quantization based on the quantization rate on the each region after compression; and performing entropy encoding on the quantized data.

4. The image compression method as claimed in claim 3, wherein:
    at least one of the plurality of regions comprises a tile, and the tile is set to have a tile size such that the tile covers a human face in the image.

5. An article of manufacture having one or more computer-readable storage media storing instructions thereon which, when executed by a system, cause the system to perform an image compression method comprising:
    dividing an image into a plurality of regions;
    applying a wavelet transform to the plurality of regions;
    designating a region of interest for a part of the image that is of interest;
    setting a level of interest for each region of interest;
    setting a quantization rate for each wavelet transformed region, according to the level of interest, wherein when the quantization rate of the region of interest is set higher than quantization rates of the other regions, the image quality of the region of interest becomes coarser, while, when the quantization rate of the region of interest is set lower than quantization rates of the other regions, the image quality of the region of interest becomes finer;
    controlling compression for each region based on the quantization rate;
    performing quantization based on the quantization rate on the each region after compression; and
    performing entropy encoding on the quantized data.

6. The article of manufacture as claimed in claim 5, wherein:
    at least one of the plurality of regions comprises a tile, and the tile is set to have a tile size such that the tile covers a human face in the image.

* * * * *

UNITED STATES PATENT AND TRADEMARK OFFICE
CERTIFICATE OF CORRECTION

PATENT NO. : 7,352,908 B2  Page 1 of 1
APPLICATION NO. : 10/390263
DATED : April 1, 2008
INVENTOR(S) : Taku Kodama It is certified that error appears in the above-identified patent and that said Letters Patent is hereby corrected as shown below:

On the Title Page, Item (73), please delete "Ricoh Co., Ltd., Tokyo (JP)" and insert -- Ricoh Company, Ltd., Tokyo (JP) --.

Signed and Sealed this

Eighteenth Day of November, 2008

JON W. DUDAS
*Director of the United States Patent and Trademark Office*